US012159435B2

(12) United States Patent
Oh et al.

(10) Patent No.: US 12,159,435 B2
(45) Date of Patent: Dec. 3, 2024

(54) POINT CLOUD DATA PROCESSING DEVICE AND METHOD

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 341 days.

(21) Appl. No.: 17/627,409

(22) PCT Filed: Jul. 31, 2020

(86) PCT No.: PCT/KR2020/010150
§ 371 (c)(1),
(2) Date: Jan. 14, 2022

(87) PCT Pub. No.: WO2021/025392
PCT Pub. Date: Feb. 11, 2021

(65) Prior Publication Data
US 2022/0319053 A1   Oct. 6, 2022

(30) Foreign Application Priority Data
Aug. 2, 2019 (KR) .................. 10-2019-0094495

(51) Int. Cl.
*G06K 9/00* (2022.01)
*G06T 9/00* (2006.01)
*H04L 65/70* (2022.01)

(52) U.S. Cl.
CPC ............. *G06T 9/001* (2013.01); *H04L 65/70* (2022.05)

(58) Field of Classification Search
CPC .......................................... G06T 2207/10028
See application file for complete search history.

(56) References Cited

U.S. PATENT DOCUMENTS

| | | | |
|---|---|---|---|
| 10,869,059 B2 * | 12/2020 | Mammou | H04N 19/167 |
| 11,010,928 B2 * | 5/2021 | Mammou | G06T 9/00 |
| 11,049,266 B2 * | 6/2021 | Janus | G06T 17/00 |
| 11,151,742 B2 * | 10/2021 | Oh | G06T 7/62 |
| 2018/0268570 A1 | 9/2018 | Budagavi et al. | |
| 2019/0108654 A1 | 4/2019 | Lasserre et al. | |
| 2019/0116357 A1 * | 4/2019 | Tian | H04N 19/14 |
| 2019/0122393 A1 | 4/2019 | Sinharoy et al. | |
| 2019/0139266 A1 | 5/2019 | Budagavi et al. | |
| 2019/0156519 A1 * | 5/2019 | Mammou | H04N 19/172 |

(Continued)

FOREIGN PATENT DOCUMENTS

| | | |
|---|---|---|
| JP | 6501240 | 4/2019 |
| KR | 20190053129 | 5/2019 |

OTHER PUBLICATIONS

International Search Report and Written Opinion in International Appln. No. PCT/KR2020/010150, dated Nov. 13, 2020, 17 pages (with English translation).

(Continued)

*Primary Examiner* — Hadi Akhavannik
(74) *Attorney, Agent, or Firm* — Fish & Richardson P.C.

(57) ABSTRACT

A point cloud data processing method according to embodiments may comprise: encoding point cloud data; and transmitting the encoded point cloud data. The point cloud data processing method according to embodiments may comprise: receiving point cloud data; and decoding the received point cloud data.

8 Claims, 28 Drawing Sheets

(56) References Cited

U.S. PATENT DOCUMENTS

| | | | |
|---|---|---|---|
| 2019/0164332 A1* | 5/2019 | Matsunobu | G06T 17/00 |
| 2019/0197739 A1 | 6/2019 | Sinharoy et al. | |
| 2019/0228050 A1* | 7/2019 | Chou | G06F 17/175 |
| 2019/0236810 A1 | 8/2019 | Vosoughi et al. | |
| 2020/0043190 A1* | 2/2020 | Tanner | G06T 15/005 |
| 2020/0045344 A1* | 2/2020 | Boyce | H04N 21/816 |
| 2020/0302632 A1* | 9/2020 | Oh | H04N 19/597 |
| 2021/0005006 A1* | 1/2021 | Oh | H04N 21/85406 |

OTHER PUBLICATIONS

Extended Search Report in European Appln. No. 20850455.5, mailed on Apr. 26, 2023, 7 pages.

* cited by examiner

FIG. 6
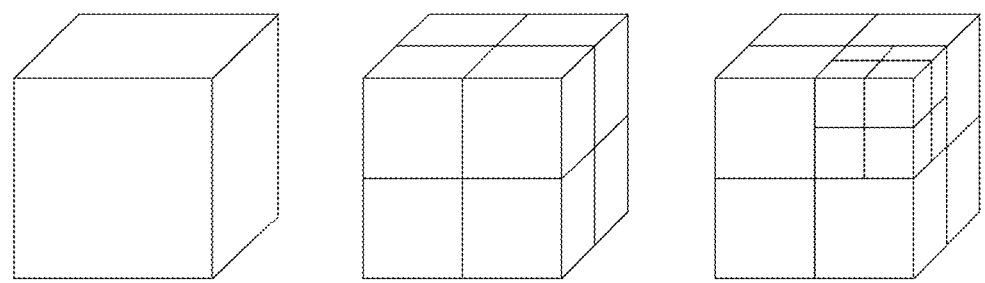
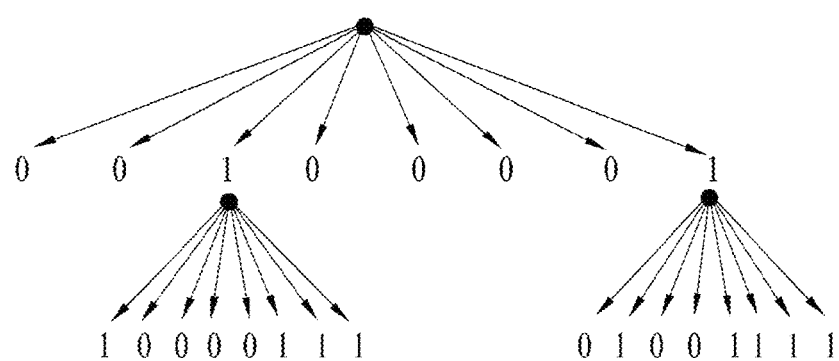

FIG. 7
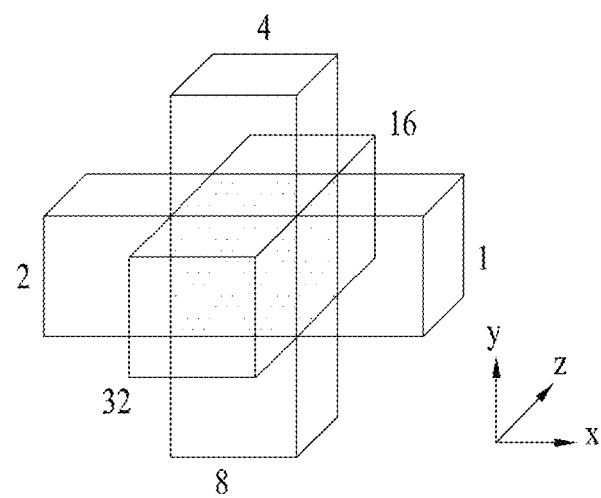
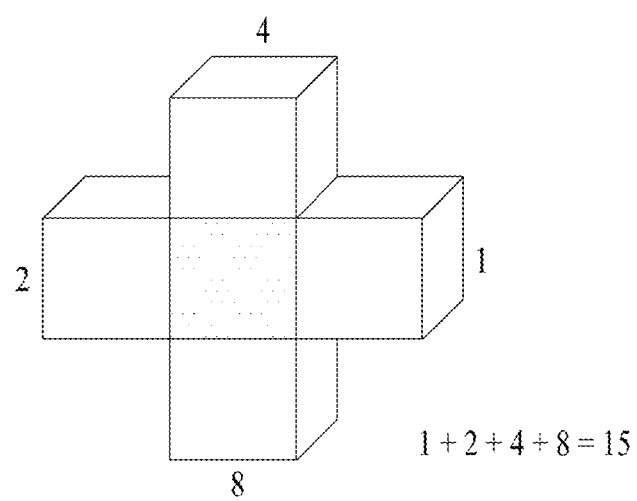
$1 + 2 + 4 + 8 = 15$

FIG. 18

| seq_parameter_set( ) { | Descriptor |
|---|---|
|     profile_compatibility_flags | u(24) |
|     level_idc | u(8) |
|     sps_bounding_box_present_flag | u(1) |
|     if( sps_bounding_box_present_flag ) { | |
|         sps_bounding_box_offset_x | se(v) |
|         sps_bounding_box_offset_y | se(v) |
|         sps_bounding_box_offset_z | se(v) |
|         sps_bounding_box_scale_factor | ue(v) |
|         sps_bounding_box_size_width | ue(v) |
|         sps_bounding_box_size_height | ue(v) |
|         sps_bounding_box_size_depth | ue(v) |
|     } | |
|     sps_source_scale_factor [Ed. TMC13 v6 uses float, but integer is preferred.] | u(32) |
|     sps_seq_parameter_set_id | ue(v) |
|     sps_num_attribute_sets | ue(v) |
|     for( i = 0; i < sps_num_attribute_sets; i++ ) { | |
|         attribute_dimension[ i ] | ue(v) |
|         attribute_instance_id[ i ] | ue(v) |
|         attribute_bitdepth[ i ] | ue(v) |
|         attribute_cicp_colour_primaries[ i ] | ue(v) |
|         attribute_cicp_transfer_characteristics[ i ] | ue(v) |
|         attribute_cicp_matrix_coeffs[ i ] | ue(v) |
|         attribute_cicp_video_full_range_flag[ i ] | u(1) |
|         known_attribute_label_flag[ i ] | u(1) |
|         if( known_attribute_label_flag[ i ] ) | |
|             known_attribute_label[ i ] | ue(v) |
|         else | |
|             attribute_label_four_bytes[ i ] | u(32) |
|     } | |
|     sps_aux_data_present_flag | u(1) |
|     sps_geom_aux_data_present_flag | u(1) |
|     sps_attr_aux_data_present_flag | u(1) |
|     sps_extension_present_flag | u(1) |
|     if( sps_extension_present_flag ) | |
|         while( more_data_in_byte_stream( ) ) | |
|             sps_extension_data_flag | u(1) |
|     byte_alignment( ) | |
| } | |

| | Descriptor |
|---|---|
| geometry_parameter_set( ) { | |
| gps_geom_parameter_set_id | ue(v) |
| gps_seq_parameter_set_id | ue(v) |
| gps_box_present_flag | u(1) |
| if( gps_box_present_flag ) { | |
| gps_gsh_box_log2_scale_present_flag | u(1) |
| if( gps_gsh_box_log2_scale_present_flag == 0 ) | |
| gps_gsh_box_log2_scale | ue(v) |
| } | |
| unique_geometry_points_flag | u(1) |
| neighbour_context_restriction_flag | u(1) |
| inferred_direct_coding_mode_enabled_flag | u(1) |
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| gps_extension_present_flag | u(1) |
| if( gps_extension_present_flag ) | |
| while( more_data_in_byte_stream( ) ) | |
| gps_extension_data_flag | u(1) |
| if( sps_geom_aux_data_present_flag ) { | |
| gps_geom_aux_data_info | u(4) |
| gps_geom_aux_data_info_type | u(4) |
| gps_optional_flag | u(1) |
| gps_slice_id | u(8) |
| } | |
| byte_alignment( ) | |
| } | |

1901

| gps_geom_aux_data_info | description |
|---|---|
| 0 | Metadata |
| 1 | point cloud data |
| 2 | text data |
| ...15 | reserved |

1902

| gps_geom_aux_data_info_type | description |
|---|---|
| 0 | Residuals for lossless attribute |
| 1 | Additional attribute data for enhanced attribute (PSNR enhancement) |
| 2 | neighbor indexes (for reduced decoding time) |
| 3 | Geometry data (duplicated point) |
| 4..15 | reserved |

FIG. 20

```
attribute_parameter_set( ) {                                              Descriptor
    aps_attr_parameter_set_id                                             ue(v)
    aps_seq_parameter_set_id                                              ue(v)
    attr_coding_type                                                      ue(v)
    aps_attr_initial_qp                                                   ue(v)
    aps_attr_chroma_qp_offset                                             se(v)
    aps_slice_qp_delta_present_flag                                       u(1)
    isLifting = ( attr_coding_type == 0 ) ] attr_coding_type == 2 ) ? 1 : 0
    if( isLifting ) {
        lifting_num_pred_nearest_neighbours                               ue(v)
        lifting_max_num_direct_predictors                                 ue(v)
        lifting_search_range                                              ue(v)
        lifting_lod_regular_sampling_enabled_flag                         u(1)
        lifting_num_detail_levels_minus1                                  ue(v)
        [Ed: The V6.0 code use the variable without minus1. It should be aligned]
        for( idx = 0; idx <= num_detail_levels_minus1; idx++ ) {
            if( lifting_lod_decimation_enabled_flag )
                lifting_sampling_period[ idx ]                            ue(v)
            else
                lifting_sampling_distance_squared[ idx ]                  ue(v)
        }
    }
    if( attr_coding_type == 0 ) {
        lifting_adaptive_prediction_threshold                             ue(v)
        lifting_intra_lod_prediction_num_layers                           ue(v)
    }
    if( sps_attr_aux_data_present_flag ) {
        aps_attr_aux_data_info                                            u(4)
        aps_attr_aux_data_info_type                                       u(4)
        aps_optional_flag                                                 u(8)
        aps_slice_id
    }
    aps_extension_present_flag                                            u(1)
    if( aps_extension_present_flag ) {
        while( more_data_in_byte_stream( ) )
            aps_extension_data_flag                                       u(1)
    }
    byte_alignment( )
}
```

2000

| aps_attr_aux_data_info | description      |
|------------------------|------------------|
| 0                      | Metadata         |
| 1                      | point cloud data |
| 2                      | text data        |
| 3-15                   | reserved         |

2001

| aps_attr_aux_data_info_type | description |
|-----------------------------|-------------|
| 0 | Residuals for lossless attribute |
| 1 | Additional attribute data for enhanced attribute (PSNR enhancement) |
| 2 | neighbor indexes (for reduced decoding time) |
| 3 | Attribute data (duplicated point) |
| 4-15 | reserved |

| | Descriptor |
|---|---|
| general_auxiliary_slice_bitstream( ) { | |
|   auxiliary_slice_header( ) | |
|   auxiliary_slice_data( ) | |
| } | |

| auxiliary_slice_header( ) { | Descriptor | |
|---|---|---|
|   auxsh_parameter_set_id | ue(v) | // SPS or GPS or APS or AuxPS |
|   auxsh_slice_id | ue(v) | |
|   auxsh_data_type | u(4) | // geometry, attribute, general |
|   auxsh_data_info | u(4) | |
|   auxsh_data_info_type | u(4) | |
|   auxsh_codec_type | u(4) | |
|   auxsh_lossless_flag | u(1) | |
|   auxsh_num_data | u(8) | |
|   byte_alignment( ) | | |
| } | | |

| auxiliary_slice_data( ) { | Descriptor |
|---|---|
|   for( i = 0; i < auxsh_num_data; i++ ) | |
|     aux_data[ i ] | ue(v) |
| } | |

2101

| auxsh_data_type | description | example |
|---|---|---|
| 0 | general | Annotation to the specific data/point/region/ |
| 1 | geometry | Residual data for lossless geometry decoding |
| 2 | attribute | Coefficient for scalable attribute representation |
| 3-15 | reserved | |

2102

| auxsh_data_info | description |
|---|---|
| 0 | Metadata |
| 1 | point cloud data |
| 2 | text data |
| 3-15 | reserved |

2103

| auxsh_data_info_type | description |
|---|---|
| 0 | metadata - coefficients |
| 0 | metadata - neighbor index |
| 0 | metadata - number of duplicated points |
| 3-15 | reserved |
| 1 | point cloud data - duplicate point position/attribute |
| 1 | Point cloud data - residual for PSNR enhancement |
| 1 | Point cloud data - residual for lossless |
| 1 | Point cloud data - transformed data |
| 4-15 | Reserved |

| | Descriptor |
|---|---|
| aux_parameter_set( ) { | |
|   auxps_aux_parameter_set_id | ue(v) |
|   auxps_seq_parameter_set_id | ue(v) |
|   auxps_num_aux_data | u(8) |
|   for( i=0; i < auxps_num_aux_data; i++) { | |
|     auxps_aux_id | u(7) |
|     auxps_optional_flag | u(1) |
|     auxps_data_type  // geometry, attribute, general | u(4) |
|     auxps_data_info  // metadata, point cloud data, text | u(4) |
|     auxps_data_info_type // specific application | u(4) |
|     auxps_codec_type | u(4) |
|     auxps_rec_order | u(7) |
|     auxps_lossless_flag | u(1) |
|   } | |
|   auxps_extension_present_flag | u(1) |
|   if( auxps_extension_present_flag ) | |
|     while( more_data_in_byte_stream( ) ) | |
|       auxps_extension_data_flag | u(1) |
|   byte_alignment( ) | |
| } | |

2201

| auxps_data_type | description | example |
|---|---|---|
| 0 | general | Annotation to the specific data/point/region |
| 1 | geometry | Residual data for lossless geometry decoding |
| 2 | attribute | Coefficient for scalable attribute representation |
| 3-15 | reserved | |

2202

| auxps_data_info | description |
|---|---|
| 0 | Metadata |
| 1 | point cloud data |
| 2 | text data |
| 3-15 | reserved |

2203

| auxps_data_info | auxps_data_info_type | description |
|---|---|---|
| 0 | 0 | metadata - neighbor index |
| 0 | 1 | metadata - coefficients |
| 0 | 2 | metadata - number of duplicated points |
| 0 | 3-15 | reserved |
| 1 | 0 | point cloud data - duplicate point position/attribute |
| 1 | 1 | Point cloud data - residual for PSNR enhancement |
| 1 | 2 | Point cloud data - residual for lossless |
| 1 | 3 | Point cloud data - transformed data |
| 1 | 4-15 | Reserved |

| general_auxiliary_slice_bitstream( ) { | Descriptor |
|---|---|
|     auxiliary_slice_header( ) | |
|     auxiliary_slice_data( ) | |
| } | |

| auxiliary_slice_header( ) { | Descriptor |
|---|---|
|     auxsh_aux_parameter_set_id | ue(v) |
|     auxsh_slice_id | ue(v) |
|     auxsh_ref_geom_slice_id | ue(v) |
|     auxsh_ref_attr_slice_id | ue(v) |
|     auxsh_num_aux_data_types | u(8) |
|     for ( i=0; i < auxsh_num_aux_data_types; i++) { | |
|         auxsh_data_type      // geometry, attribute, general | u(4) |
|         auxsh_data_info | u(4) |
|         auxsh_data_info_type      // specific application | u(4) |
|         auxsh_aux_id | u(7) |
|     } | |
|     auxsh_num_voxel | u(8) |
|     byte_alignment( ) | |
| } | |

| auxiliary_slice_data( ) { | Descriptor |
|---|---|
|     for( i = 0; i < auxsh_num_voxel; i++ ) { | |
|         voxel_idx_type [ i ] | ue(v) |
|         voxel_index[ i ] // XYZ position, morton code, morton code index | ue(v) |
|         for( j=0; j < auxsh_num_aux_data_types; j++) { | |
|             aux_id | u(7) |
|             data_present_flag | u(1) |
|             if( data_present_flag ) | |
|                 aux_data[ i ][ j ] | ue(v) |
|         } | |
|     } | |
| } | |

FIG. 26
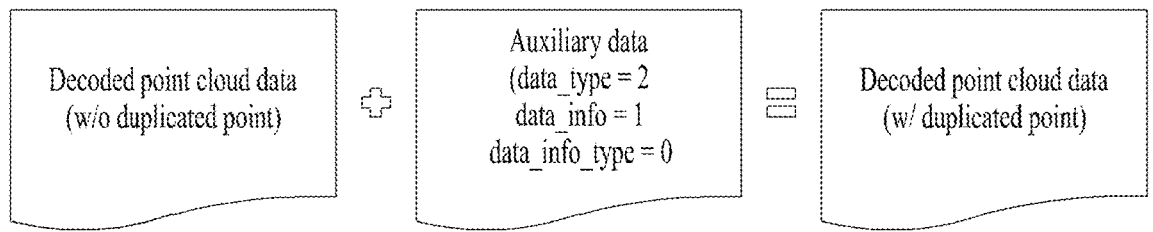
(a)
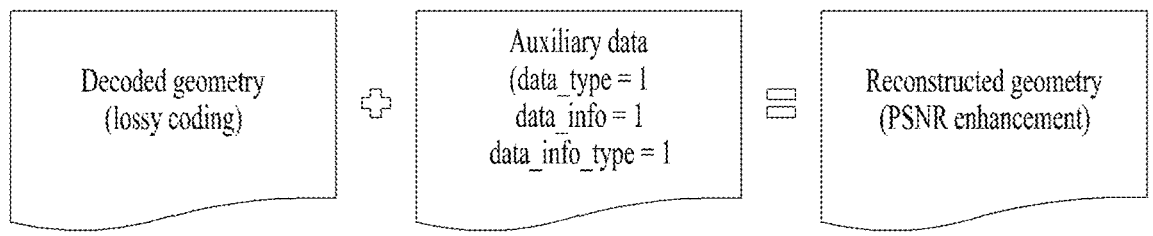
(b)
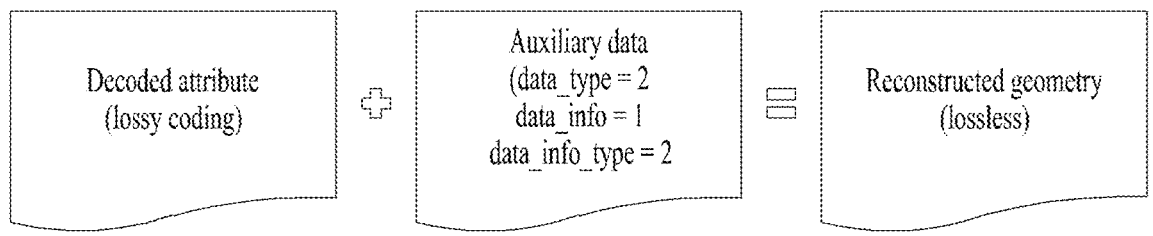
(c)

POINT CLOUD DATA PROCESSING DEVICE AND METHOD

CROSS-REFERENCE TO RELATED APPLICATIONS

This application is a National Stage application under 35 U.S.C. § 371 of International Application No. PCT/KR2020/010150, filed on Jul. 31, 2020, which claims the benefit of Korean Application No. 10-2019-0094495, filed on Aug. 2, 2019. The disclosures of the prior applications are incorporated by reference in their entirety.

TECHNICAL FIELD

The present disclosure provides a method for providing point cloud contents to provide a user with various services such as virtual reality (VR), augmented reality (AR), mixed reality (MR), and self-driving services.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide an apparatus and method for efficiently processing point cloud data. Embodiments provide a point cloud data processing method and apparatus for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

Accordingly, in some embodiments, in order to efficiently process point cloud data, a method of transmitting point cloud data includes encoding point cloud data and transmitting a bitstream including the encoded point cloud data.

In some embodiments, a method of receiving point cloud data includes receiving a bitstream including point cloud data and decoding the point cloud data.

Advantageous Effects

Apparatuses and methods according to embodiments may process point cloud data with high efficiency.

The apparatuses and methods according to the embodiments may provide a high-quality point cloud service.

The apparatuses and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts.

FIG. 6 shows an example of an octree and occupancy code according to embodiments;

FIG. 7 shows an example of a neighbor node pattern according to embodiments;

FIG. 18 illustrates a structure of a sequential parameter set (SPS) of point cloud data according to embodiments;

FIG. 19 shows a structure of a geometry parameter set (GPS) of point cloud data according to embodiments;

FIG. 20 shows a structure of an attribute parameter set (APS) of point cloud data according to embodiments;

FIG. 21 shows a structure of an auxiliary slice bitstream of point cloud data according to embodiments;

FIG. 22 shows a structure of an auxiliary parameter set (AuxPS) of point cloud data according to embodiments;

FIG. 23 shows a structure of an auxiliary slice bitstream of point cloud data according to embodiments;

FIG. 26 illustrates an exemplary process of using auxiliary data after decoding according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
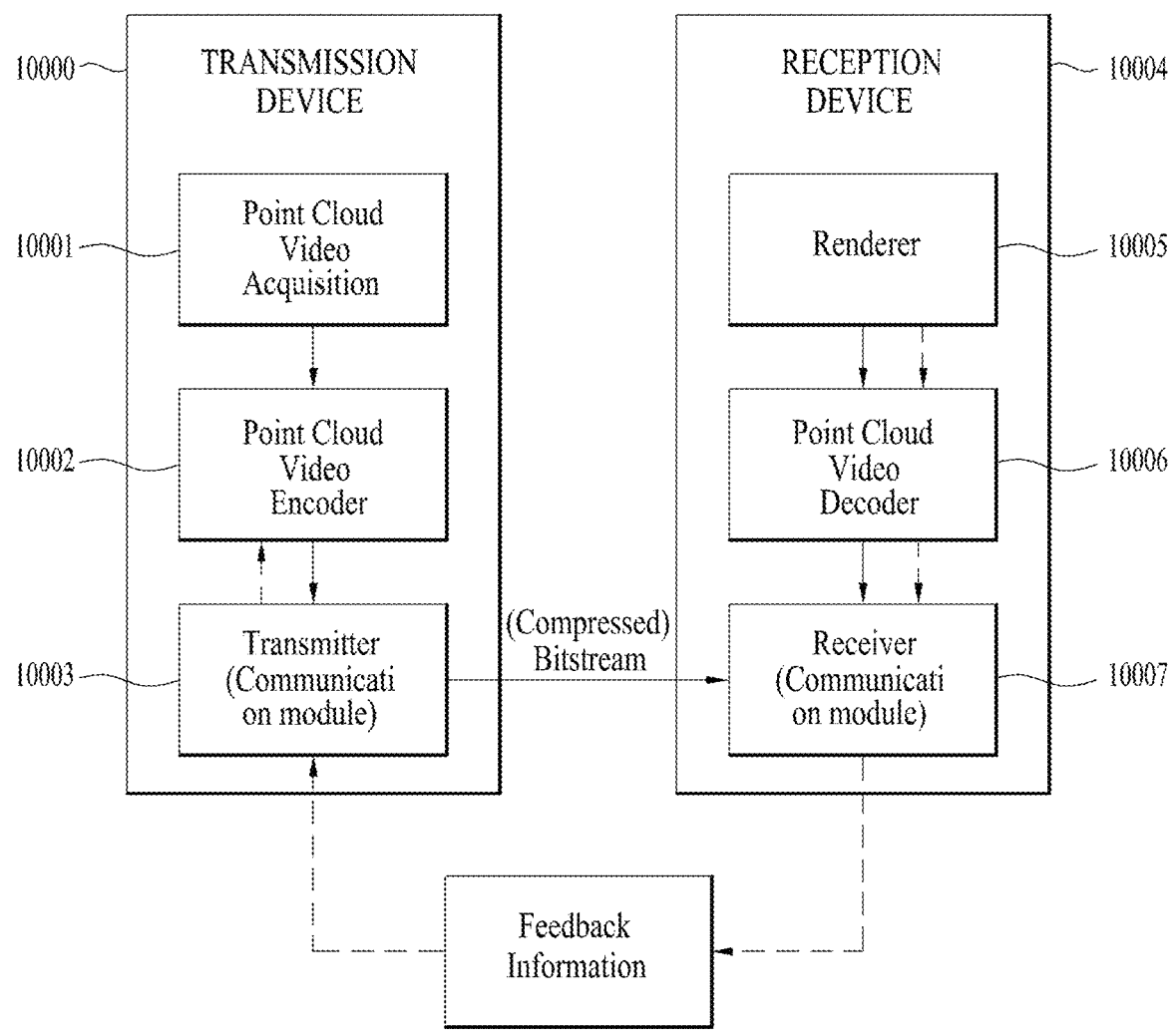
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
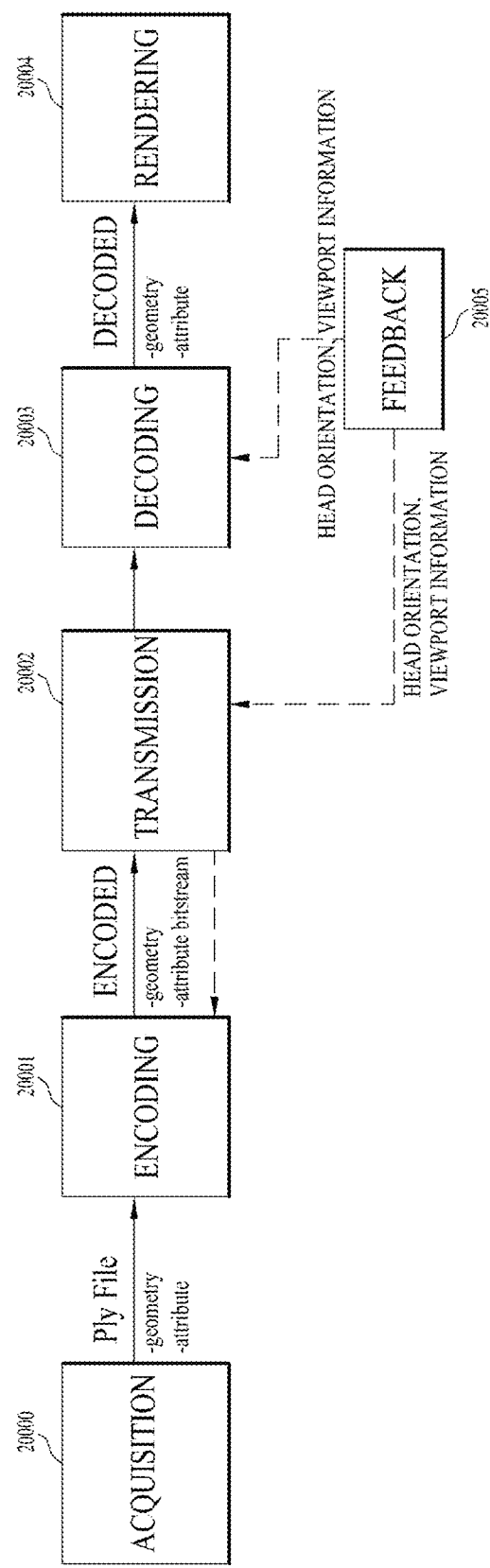
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream.

According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
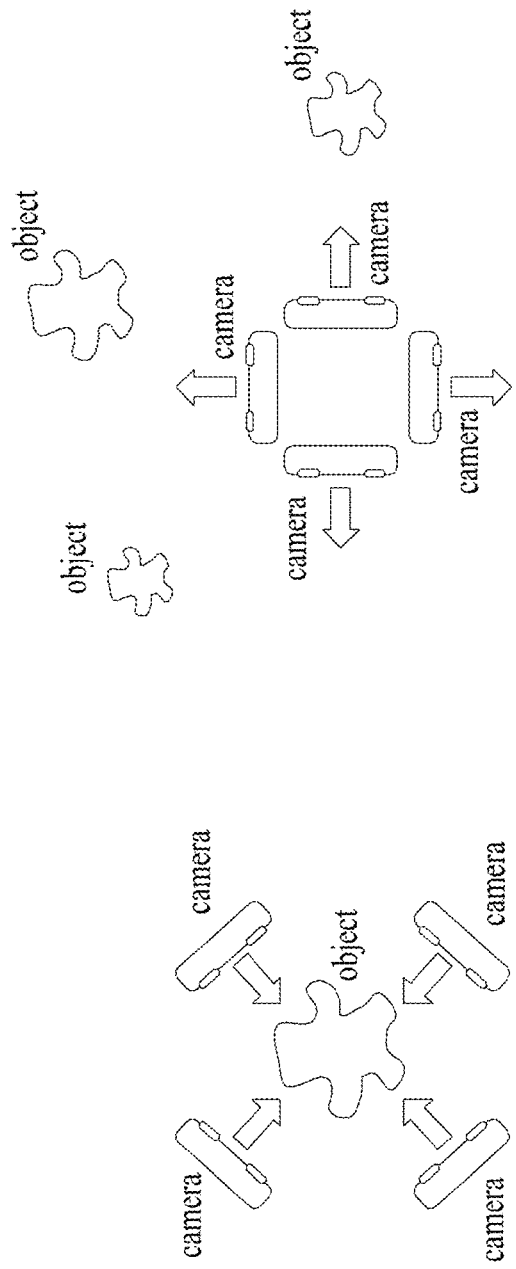
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
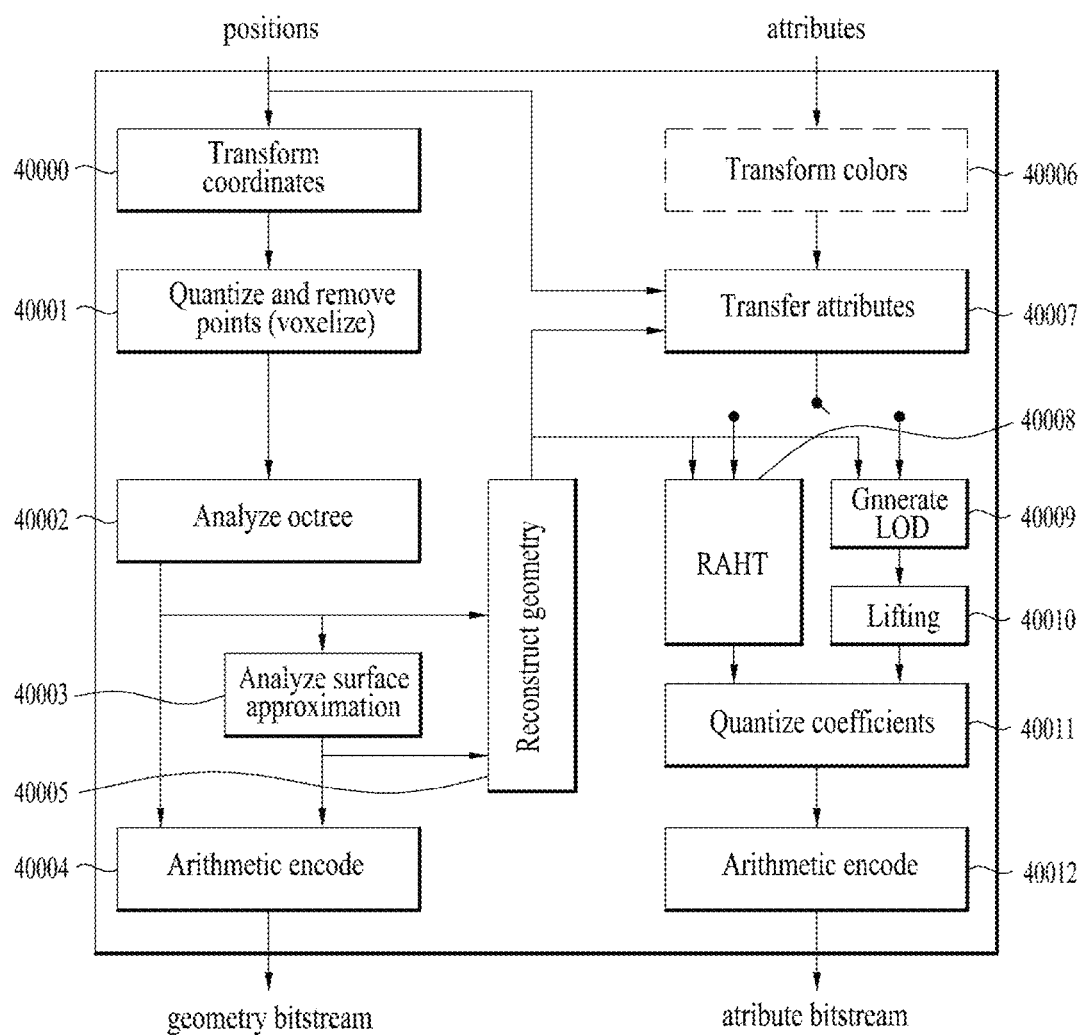
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing apparatus, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
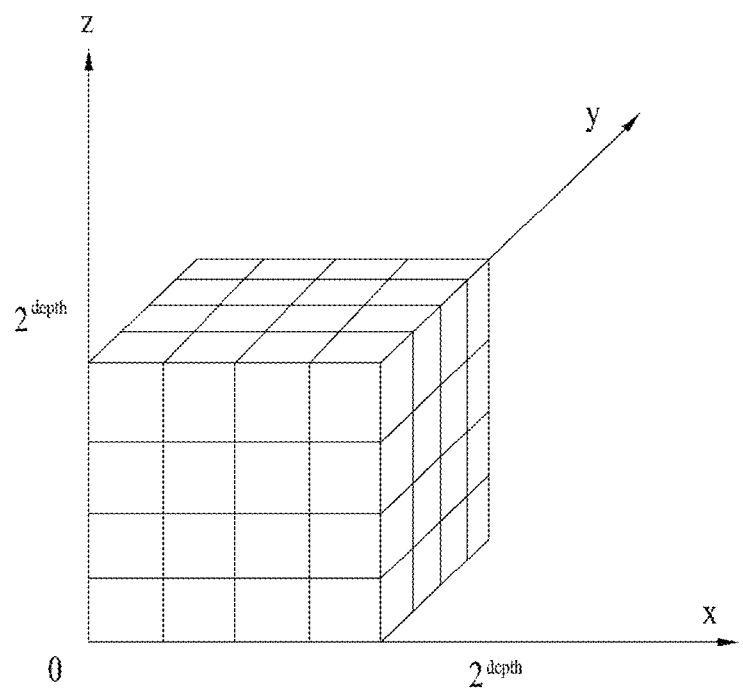
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and (2d, 2d, 2d).

Here, 2d may be set to a value constituting the smallest bounding box surrounding all points of the point cloud content (or point cloud video). Here, d denotes the depth of the octree. The value of d is determined in the following equation. In the following equation, (xintn, yintn, zintn) denotes the positions (or position values) of quantized points.

$$d=\text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \qquad \text{i}$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \qquad \text{ii}$$

$$\begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix} \qquad \text{iii}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE Triangles formed from vertices ordered 1, . . . , n

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 2³=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
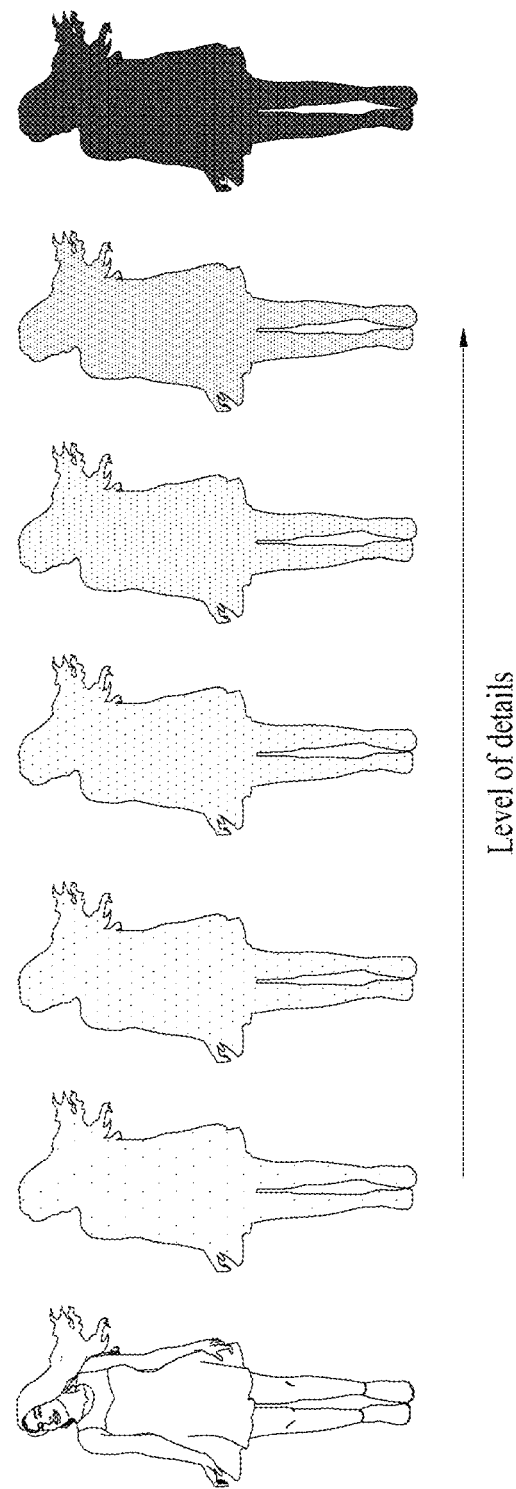
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
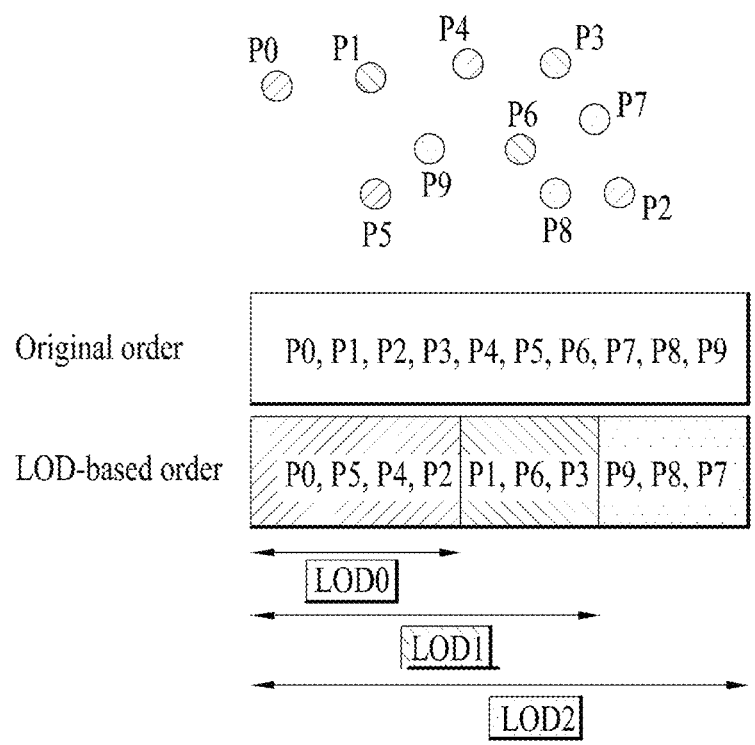
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

Attribute Prediction Residuals Quantization Pseudo Code

TABLE 2

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

Attribute Prediction Residuals Inverse Quantization Pseudo Code

TABLE 3

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation. The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\,w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
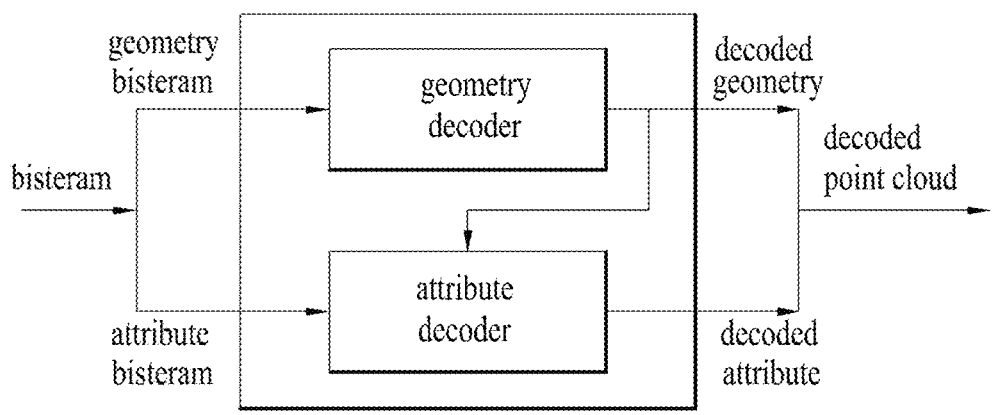
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
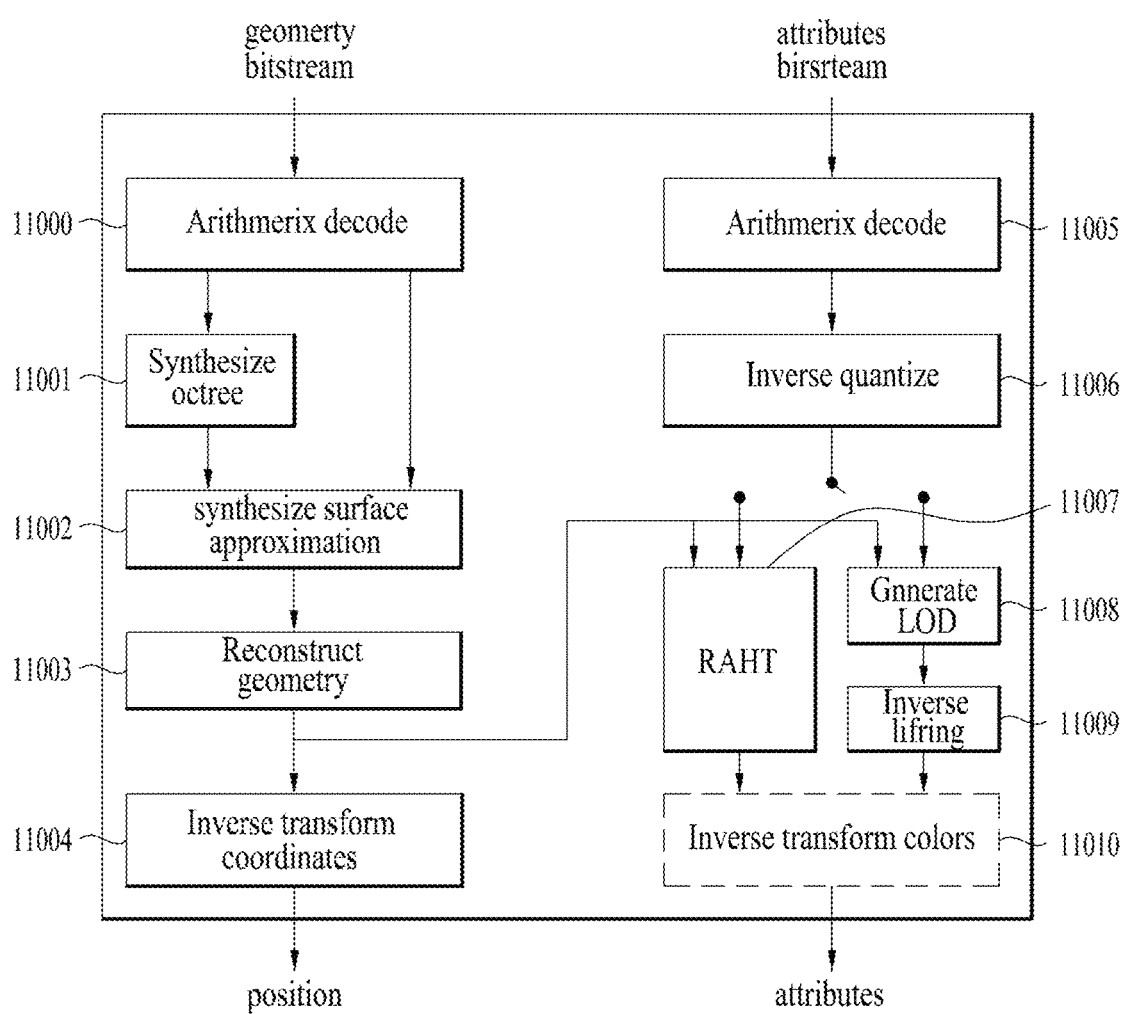
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing apparatus, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
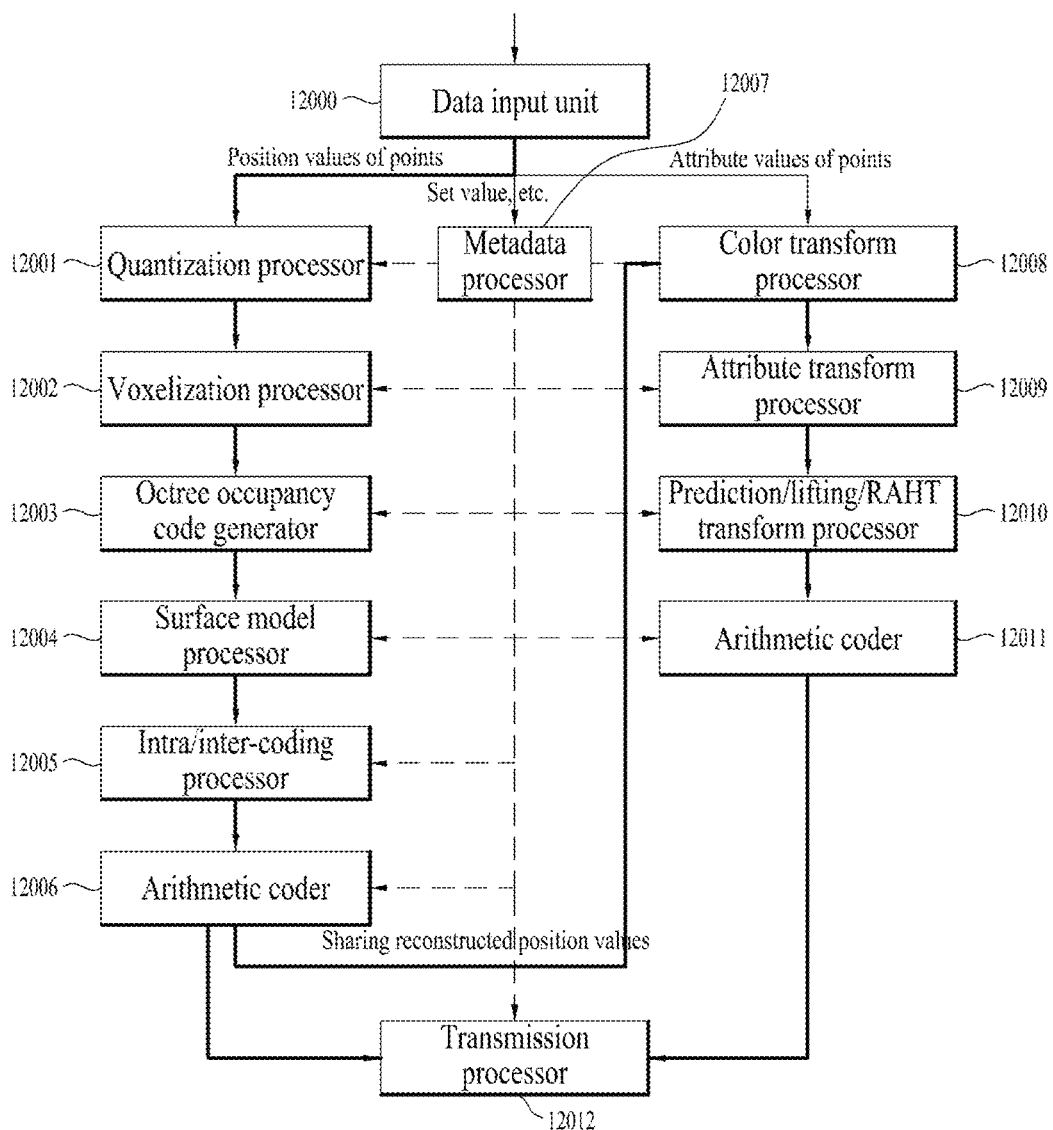
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
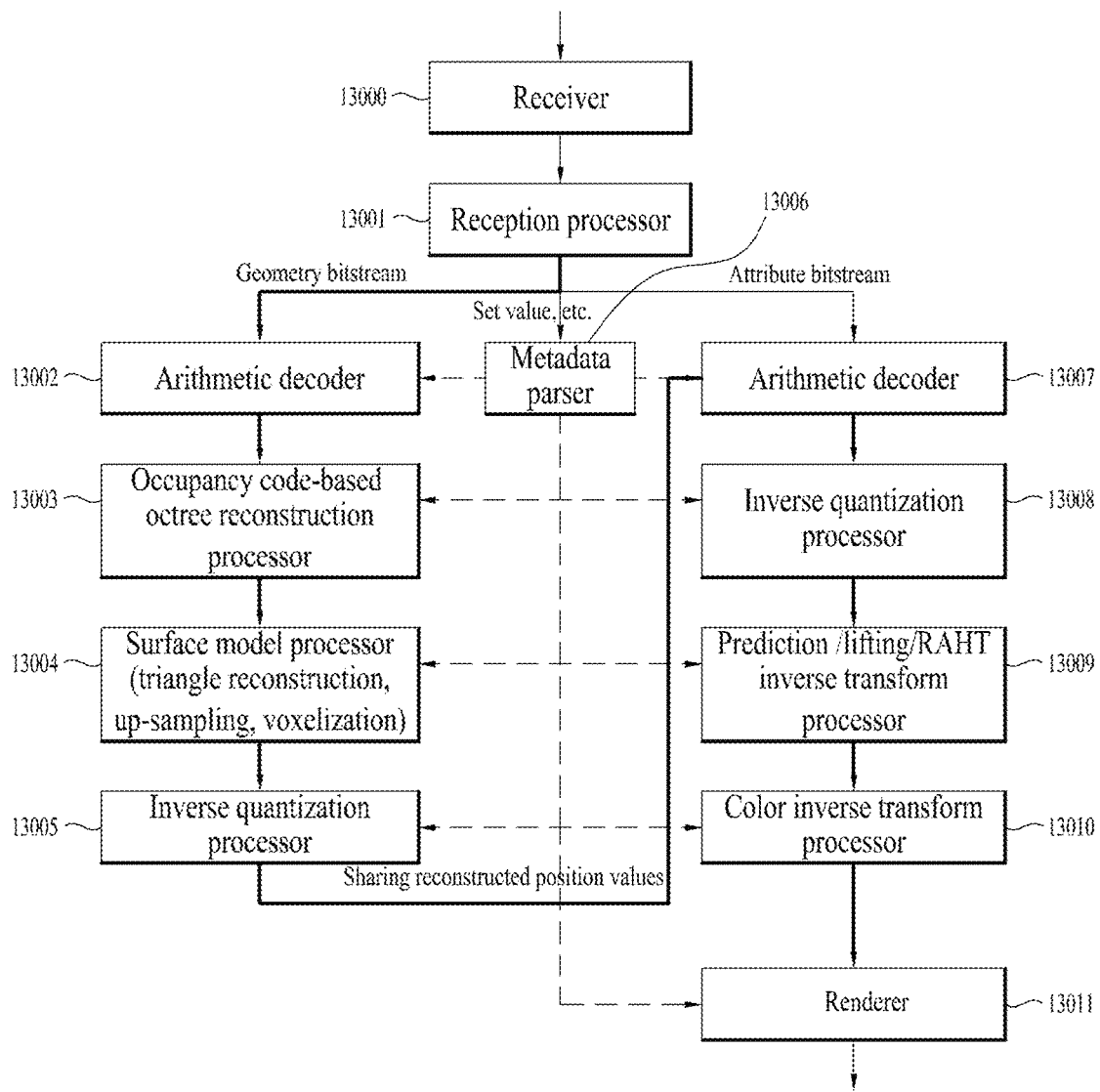
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
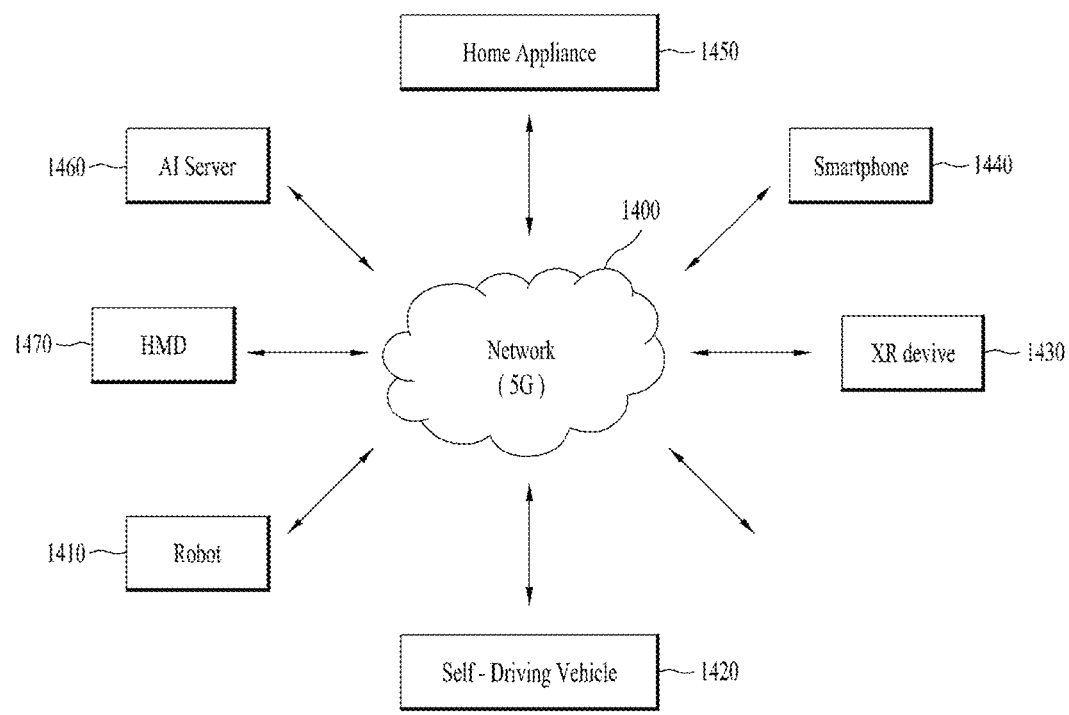
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
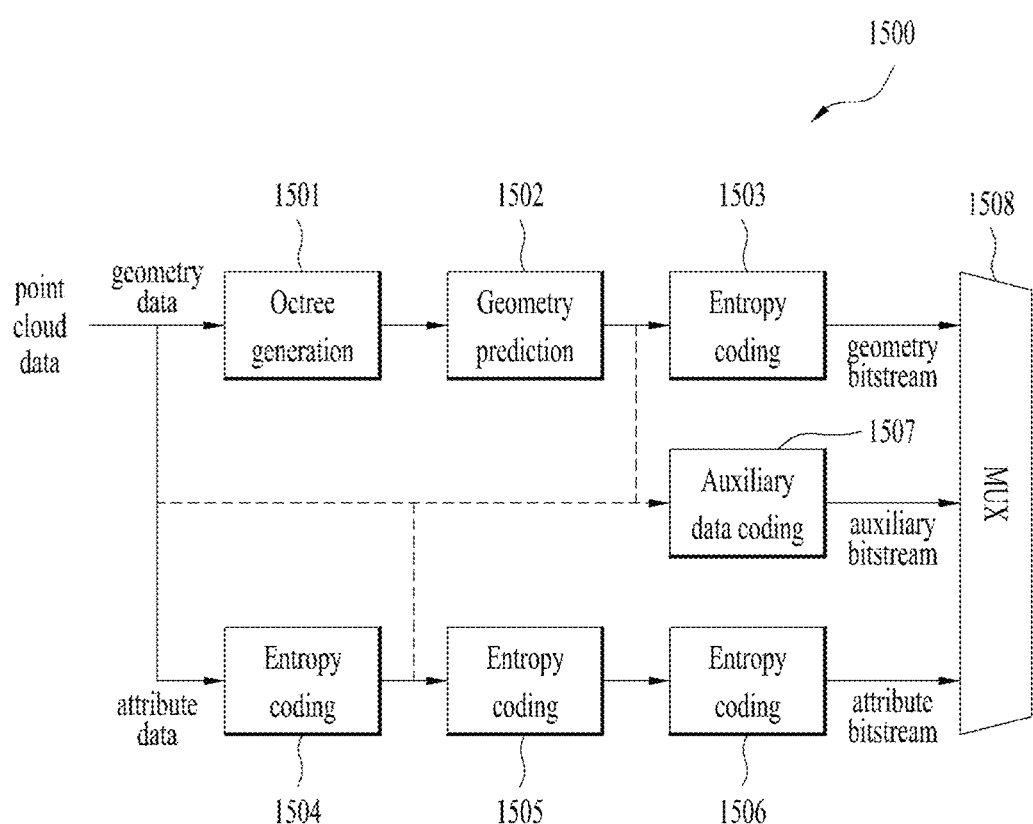
FIG. 15 is a block diagram illustrating an exemplary point cloud transmission device according to embodiments.

FIG. 15 is a block diagram illustrating an exemplary point cloud transmission device according to embodiments.

The point cloud data transmission device 1500 (e.g., the point cloud video encoder 10002 of FIG. 1, the point cloud encoder of FIG. 4, and the point cloud encoder described with reference to FIG. 12) according to the embodiments may perform the encoding operation described with reference to FIGS. 1 to 14. The point cloud data transmission device may include an octree generator (Octree generation) 1501, a geometry predictor (Geometry prediction) 1502, an entropy coder (Entrophy coding) 1503, an attribute predictor (Attribute prediction) 1504, a transform/quantization unit (Transform & quantization) 1505, an entropy coder (Entrophy coding) 1506, an auxiliary data encoder (Auxiliary data coding) 1507, and/or a multiplexer (MUX) 1508. Although not shown in FIG. 15, the point cloud data transmission device may further include one or more elements configured to perform the encoding operation described with reference to FIGS. 1 to 14. Each element in this figure may correspond to hardware, software, a processor, and/or a combination thereof.

Point cloud (PCC) data or point cloud compression (PCC) data is input data to the point cloud transmission device 1500 and may include geometry and/or attributes. The geometry is information indicating a position (e.g., a location) of a point, and may be represented as parameters of coordinates such as orthogonal coordinates, cylindrical coordinates, or spherical coordinates. The attribute represents an attribute (e.g., color, transparency, reflectance, grayscale, etc.) of a point. The geometry may be referred to as geometry information (or geometry data), and the attribute may be referred to as attribute information (or attribute data).

The octree generator structures geometry information of input point cloud data for geometry coding into a structure such as an octree. The geometry information is structured based on at least one of an octree, a quadtree, a binary tree, a triple tree, or a k-d tree.

The geometry predictor according to the embodiments codes the structured geometry information.

The entropy coder 1503 entropy-codes the coded geometry information and outputs a geometry bitstream.

The octree generator, the geometry predictor, and the entropy coder 1503 perform the geometry coding (or geometry encoding) described with reference to FIGS. 1 to 14. The operations of the octree generator, the geometry predictor, and the entropy coder 1503 are the same as or similar to the operations of the coordinate transformer 40000, the quantizer 40001, the octree analyzer 40002, the surface approximation analyzer 40003, the arithmetic encoder 40004, and the geometry reconstructor (Reconstruct Geometry, 40005). Also, the operations of the octree generator, the geometry predictor, and the entropy coder 1503 are the same as or similar to the operations of the data input unit 12100, the quantization processor 12001, the voxelization processor 12002, the octree occupancy code generator 12003, the surface model processor 12004, the intra/inter-coding processor 12005, the arithmetic coder 12006, and the metadata processor 12007 described with reference to FIG. 12.

The attribute predictor receives attribute information and performs attribute coding thereon.

The transform/quantization unit performs attribute transform and/or quantization on the attribute-coded attribute information.

The entropy coder 1506 entropy-codes the transformed and/or quantized attribute information and outputs an attribute bitstream.

The attribute predictor, the transform/quantization unit, and the entropy coder 1506 according to the embodiments perform attribute encoding (or attribute coding). The operations of the attribute predictor, the transform/quantization unit, and the entropy coder 1506 are the same as or similar to the operations of the geometry reconstructor 40005, the color transformer 40006, the attribute transformer 40007, and the RAHT transformer 40008, the LOD generator 40009, the lifting transformer 40010, the coefficient quantizer 40011, and/or the arithmetic encoder 40012 described with reference to FIG. 4. Also, the operations of the attribute predictor, the transform/quantization unit, and the entropy coder 1506 are the same as or similar to the operations of the color transform processor 12008, the attribute transform processor 12009, the prediction/lifting/RAHT transform processor 12110, and the arithmetic coder 12011 described with reference to FIG. 12.

As shown in FIGS. 1 to 14, the attribute encoding according to the embodiments may include color transform coding, attribute transform coding, RAHT coding, prediction transform coding, and lifting transform coding. The RAHT coding, prediction transform coding, and lifting transform coding may be selectively used or a combination of one or more thereof may be used, depending on the point cloud content. The attribute encoding is not limited to the above-described example.

The auxiliary data encoder according to the embodiments may output an auxiliary data bitstream by encoding the generated auxiliary data. The auxiliary data may be referred to as ancillary data (or ancillary information) or auxiliary data (or auxiliary information). The auxiliary data represents auxiliary information for geometry coding, attribute coding, and/or point cloud data. Accordingly, the reception device according to the embodiments may perform geometry/attribute coding or geometry/attribute reconstruction based on the auxiliary data. In addition, the reception device according to the embodiments may acquire auxiliary text information for the point cloud data based on the auxiliary data.

The auxiliary data may be metadata or geometry data related to geometry encoding. The auxiliary data may be metadata or attribute data related to attribute encoding. The auxiliary data may be text information about point cloud data. When the auxiliary data is metadata or geometry data related to geometry encoding, the auxiliary data may be generated in the geometry encoding process. When the auxiliary data is metadata or attribute data related to attribute encoding, the auxiliary data may be generated in the attribute encoding process. When the auxiliary data is text information about point cloud data, the auxiliary data may be separately generated (not shown in this figure).

The multiplexer according to the embodiments may transmit a geometry bitstream, an attribute bitstream, and/or an auxiliary data bitstream, respectively, or configure one bitstream from a geometry bitstream, an attribute bitstream, and/or an auxiliary data bitstream and transmit the same. The operation of the multiplexer is the same as or similar to that of the transmission processor 12012 of FIG. 12.

The point cloud data transmission device according to the embodiments may generate and separately transmit auxiliary data related to geometry coding, attribute coding, and/or point cloud data. Accordingly, the reception device according to the embodiments may selectively uses the auxiliary data to perform decoding and/or rendering suitable for the reception environment (e.g., to reduce the latency of coding, or perform rendering more accurately according to the characteristics of the point cloud data).

Figure 16:
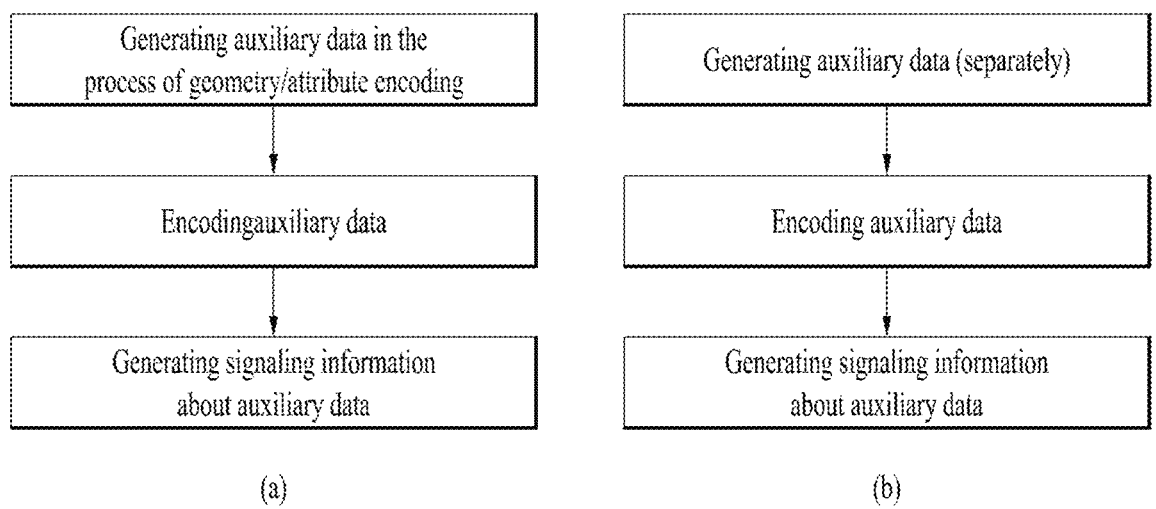
FIG. 16 is a flowchart illustrating a method of generating auxiliary data according to embodiments.

FIG. 16 is a flowchart illustrating a method of generating auxiliary data according to embodiments.

FIGS. 16-(*a*) to 16-(*b*) are flowcharts illustrating methods of generating auxiliary data by a point cloud data transmission device according to the embodiments (e.g., the point cloud data transmission device described with reference to FIGS. 1, 11, 14 and 15). For details of the auxiliary data, refer to the description of the auxiliary data of FIG. 15. That is, the transmission device may generate auxiliary data related to geometry coding, attribute coding, and/or point cloud data, and signaling information about the auxiliary data, and transmit the same to the reception device.

FIG. 16-(*a*) is a flowchart illustrating a method of generating auxiliary data related to geometry coding and/or attribute coding by a transmission device according to embodiments.

The point cloud data transmission device (e.g., the geometry predictor 1502 and/or the attribute predictor 1505 of FIG. 15) according to the embodiments may generate auxiliary data related to geometry coding and/or attribute coding in a geometry or attribute coding process. The geometry coding is the same as or similar to the geometry encoding operation of FIG. 15. The attribute coding is the same as or similar to the attribute encoding operation of FIG. 15.

The point cloud data transmission device (e.g., the auxiliary data encoder 1507 of FIG. 15) may encode the generated auxiliary data. The operation of encoding the auxiliary data is the same as or similar to that of the auxiliary data encoder 1507 of FIG. 15.

The point cloud data transmission device (e.g., the metadata processing unit 12007 of FIG. 12) according to the embodiments may generate signaling information about the auxiliary data. The signaling information (or data) about the auxiliary data may include first information indicating a type of the auxiliary data and/or second information indicating a detailed characteristic of the auxiliary data. The signaling information about the auxiliary data will be described in detail with reference to FIGS. 18 to 23.

The point cloud data transmission device according to the embodiments may transmit a bitstream (e.g., the bitstream of FIGS. 1, 2, 4 and 12) including the generated auxiliary data and/or signaling information about the auxiliary data to the point cloud data reception device.

FIG. 16-(*b*) is a flowchart illustrating a method of generating auxiliary data related to point cloud data by a transmission device according to embodiments.

The point cloud data transmission device according to the embodiments may generate auxiliary data related to point cloud data. The point cloud data transmission device may perform the operation of generating auxiliary data related to point cloud data separately from the operation of geometry and attribute encoding (e.g., the geometry and attribute encoding of FIG. 15) operation. For example, the auxiliary data related to the point cloud data may be text information about point cloud content.

The point cloud data transmission device may encode the generated auxiliary data. Since the operation of encoding the generated auxiliary data is the same as that described above, a detailed description thereof will be omitted.

The point cloud data transmission device may generate signaling information about the auxiliary data. Since the process of generating the signaling information about the auxiliary data according to the embodiments is the same as that described above, a detailed description thereof will be omitted. The signaling information about the auxiliary data will be described in detail with reference to FIGS. 18 to 23.

Figure 17:
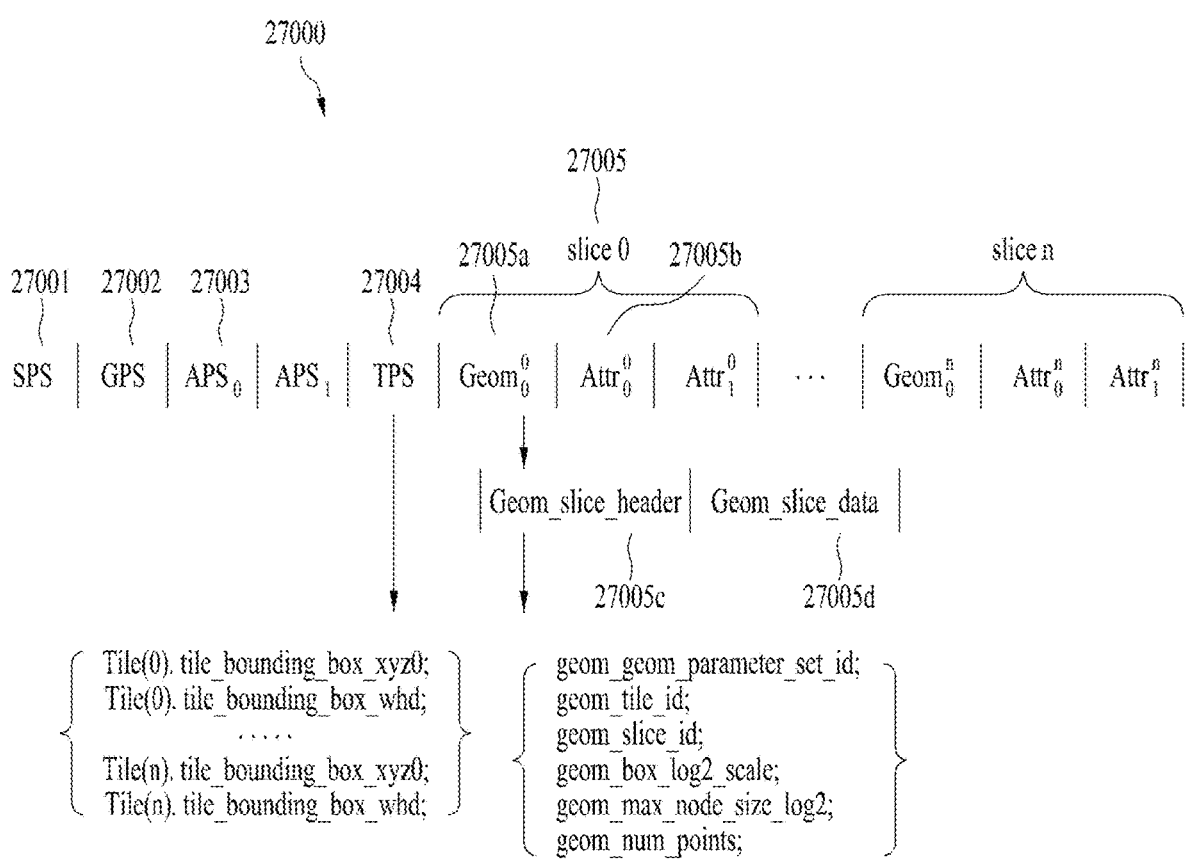
FIG. 17 shows a structure of a bitstream according to embodiments.

FIG. 17 shows a structure of a bitstream according to embodiments.

As described above, the point cloud data transmission device (e.g., the point cloud data transmission device described with reference to FIGS. 1, 11, 14 and 15) may transmit the encoded point cloud data in the form of a bitstream 27000. The bitstream 27000 may include one or more sub-bitstreams.

The point cloud data reception device (e.g., the point cloud data reception device described with reference to FIGS. 1, 2, 13 and 24) according to the embodiments receives the bitstream from the point cloud data transmission device. The point cloud data reception device may parse and decode the received bitstream.

The point cloud data transmission device (e.g., the point cloud data transmission device described in FIGS. 1, 11, 14 and 15) may divide an image of the point cloud data into one or more packets in consideration of the error of the transmission channel, and transmit the same over the network. According to embodiments, the bitstream 27000 may include one or more packets (e.g., network abstraction layer (NAL) units). Therefore, even when some packets are lost in a poor network environment, the point cloud data reception device may reconstruct the image using the remaining packets. The point cloud data may be partitioned into one or more slices or one or more tiles to be processed. The tiles and slices according to embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device may perform point cloud compression coding having better compression efficiency and appropriate latency on data corresponding to a region important to a user.

A tile according to the embodiments represents a cuboid in a three-dimensional space (e.g., a bounding box) in which point cloud data is distributed. A slice according to the embodiments is a series of syntax elements representing some or all of encoded point cloud data, and represents a set of points that may be independently encoded or decoded. According to embodiments, a slice may include data transmitted through a packet, and may include one geometry data unit and zero or more attribute data units. According to embodiments, a tile may include one or more slices.

The point cloud data transmission device according to the embodiments may transmit a bitstream 27000 having a bitstream structure as shown in this figure. The bitstream 27000 of the point cloud data may include a sequential parameter set (SPS) 27001, a geometry parameter set (GPS) 27002, an attribute parameter set (APS) 27003, a tile parameter set (TPS) 27004, and one or more may include slices 27005. The bitstream 27000 of the point cloud data may include one or more tiles. A tile according to the embodiments may be a group of slices including one or more slices.

The SPS 27001 is a syntax structure containing syntax elements that apply to zero or more entire CVSs as determined by the content of a syntax element found in the PPS referred to by a syntax element found in each slice segment header. The SPS may include sequence information about the point cloud data bitstream according to the embodiments.

The GPS 27002 may be a syntax structure including syntax elements that apply to zero or more entire geometry (or encoded geometry). The GPS 27002 may include information about a method of encoding attribute information of the point cloud data included in the one or more slices 27005. The GPS 27002 may include SPS identifier information indicating the SPS 27001 to which the included geometry parameter is related, and GPS identifier information for identifying the GPS.

The APS 27003 may be a syntax structure including syntax elements that apply to zero or more entire attributes (or encoded attributes). The APS 27003 may include information about a method of encoding attribute information of the point cloud data included in the one or more slices 27005. The APS 27003 may include SPS identifier information indicating the SPS 27001 to which the included geometry parameter is related, and APS identifier information for identifying the APS.

The TPS 27004 may be a syntax structure including syntax elements that apply to zero or more entire tiles (or encoded tiles). A tile inventory includes information about zero or more tiles included in the point cloud data bitstream. According to embodiments, the tile inventory may be referred to as a tile parameter set (TPS).

The TPS 27004 may include identifier information for identifying one or more tiles and information indicating a range of the one or more tiles (i.e., a bounding box of the tile). The information indicating the range of the one or more tiles (i.e., the bounding box of the tile) may include coordinate information about a point that is a reference of a bounding box represented by a corresponding tile (e.g., Tile(n).tile_bounding_box_xyz0) and information about the width, height, and depth of the bounding box (e.g., Tile(n).tile_bounding_box_whd). The TPS 27004 may be referred to as a tile inventory.

When a plurality of tiles is present, the tile parameter set 27004 may include information indicating a bounding box for each of the tiles. For example, when each tile is indicated as 0 to n by the identifier information for the tiles, the information indicating the bounding box of each tile may be represented as Tile(0).tile_bounding_box_xyz0, Tile(0).tile_bounding_box_whd, Tile(1).tile_bounding_box_xyz0, Tile(1).tile_bounding_box_whd, and so on.

The slice 27005 may be a unit of encoding of the point cloud data by the point cloud data transmission device. The slice 27005 may be a unit including one geometry bitstream Geom00 and one or more attribute bitstreams Attr00 and Attr10.

The slice 27005 may include a geometry slice (Geom) 27005*a* representing geometry information about the point cloud data included in the slice, and one or more attribute slices (Attr) 27005*b* representing attribute information about the point cloud data included in the slice.

The geometry slice (Geom) 27005*a* includes geometry slice data (Geom_slice_data) 27005*d* including geometry information about the point cloud data, and a geometry slice header (GSH) (Geom_slice_header) 27005*c* including information about the geometry slice data.

The GSH 27005*c* contains information about the geometry slice data 27005*d* in the slice. For example, the GSH 27005*c* may contain a geometry parameter set identifier (geom_geom_parameter_set_id) for identifying the GPS 27002 representing the geometry information about the slice, and a geometry slice identifier (geom_slice_id) for identifying the geometry slice, geometry box origin information (geomBoxOrigin) indicating the origin of the box of the geometry slice data, information (geom_box_log 2_scale) indicating a logarithmic scale of the geometry slice, and information (geom_num_points) related to the number of points in the geometry slice.

When the point cloud data bitstream according to the embodiments contains one or more tiles, the header of the geometry bitstream may further contain information (geom_tile_id) for identifying a tile including the geometry bitstream.

The attribute slice (Attr) 27005*a* includes attribute slice data (Attr_slice_data) containing attribute information about the point cloud data and an attribute slice header (ASH) (Attr_slice_header) 27005*c* containing information about the attribute slice data.

According to embodiments, parameters required to encode a point cloud may be newly defined as a parameter set and header information for the point cloud. For example, the parameters may be added to the attribute parameter set RBSP syntax in encoding attribute information, and be added to the tile_header syntax in performing tile-based encoding.

According to embodiments, the above-described parameters may be signaled on a tile-by-tile basis or a slice-by-slice basis. The above-described parameters may be signaled in the SPS, the GPS, the APS, or the tile inventory.

When the point cloud data according to the embodiments is transmitted on a slice-by-slice basis, the parameters shown in FIG. 17 according to the embodiments may be included in the APS including information on attribute information about each slice.

When the point cloud data according to the embodiments is transmitted on a slice-by-slice basis, the parameters shown in FIG. 17 according to the embodiments may be included in a geometry slice header (gsh).

When the point cloud data according to the embodiments is transmitted on a tile-by-tile basis, the parameters shown in FIG. 17 according to the embodiments may be included in the TPS including information on attribute information about each slice (or tile inventory).

The PCC transmission/reception method according to the embodiments may provide parameters for point cloud data for each unit such as a tile, geometry, an attribute, and/or a slice by providing the bitstream structure as described above. Accordingly, the PCC transmission/reception method according to the embodiments may provide point cloud compression coding having better compression efficiency and appropriate latency by signaling information required for coding of point cloud data according to each unit.

As the PCC transmission/reception method according to the embodiments provides the bitstream structure as described above, the decoding performance of the receiver may be enhanced for the attribute information about the point cloud data. In addition, more robust quantization may be implemented by signaling the SA-DCT transform, and accordingly a perceptual improvement in inverse transform performance may be provided at the output terminal of the decoder.

FIG. 18 illustrates a structure of a sequential parameter set (SPS) of point cloud data according to embodiments.

A bitstream of point cloud data according to embodiments may include a sequential parameter set (SPS) 1800 including signaling information (or flags) as shown in this figure. The SPS 1800 may refer to the SPS 27001 described with reference to FIG. 17. The point cloud data receiver according to the embodiments may decode the point cloud data based on the signaling information (or flag information) of this figure.

profile_idc indicates a profile to which the bitstream conforms as specified in Annex A. Bitstreams shall not contain values of profile_idc other than those specified in Annex A. Other values of profile_idc are reserved for future use by ISO/IEC.

profile_compatibility_flags equal to 1, indicates that the bitstream conforms to the profile indicated by profile_idc equal to j as specified in Annex A. The value of profile_compatibility_flag[j] shall be equal to 0 for any value of j that is not specified as an allowed value of profile_idc in Annex A.

level_idc indicates a level to which the bitstream conforms as specified in Annex A. Bitstreams may not contain values of level_idc other than those specified in Annex A. Other values of level_idc are reserved for future use by ISO/IEC.

sps_bounding_box_present_flag equal to 1 specifies the bounding box offset and size information is signalled. sps_bounding_box_present_flag equal to 0 specifies)

When the value of sps_bounding_box_present_flag is TRUE, the SPS according to the embodiments further includes sps_bounding_box_offset_x, sps_bounding_box_offset_y, sps_bounding_box_offset_z, sps_bounding_box_scale_factor, sps_bounding_box_size_width, sps_bounding_box_size_height, and sps_bounding_box_size_depth.

sps_bounding_box_offset_x indicates the x offset of the source bounding box in the Cartesian coordinates. When not present, the value of sps_bounding_box_offset_x is inferred to be 0.

sps_bounding_box_offset_y indicates the y offset of the source bounding box in the Cartesian coordinates. When not present, the value of sps_bounding_box_offset_y is inferred to be 0.

sps_bounding_box_offset_z indicates the z offset of the source bounding box in the Cartesian coordinates. When not present, the value of sps_bounding_box_offset_z is inferred to be 0.

sps_bounding_box_scale_factor indicates the scale factor the source bounding box in the Cartesian coordinates. When not present, the value of sps_bounding_box_scale_factor is inferred to be 1. Indicates. When not present, the value of sps_bounding_box_scale_factor is inferred to be 0.

sps_bounding_box_size_width indicates the width of the source bounding box in the Cartesian coordinates. When not present, the value of sps_bounding_box_size_width is inferred to be a specific value (such as 10).

sps_bounding_box_size_height indicates the height of the source bounding box in the Cartesian coordinates. When not present, the value of sps_bounding_box_size_height is inferred to be 1. When not present, the value of sps_bounding_box_size_hieght is inferred to be 0.

sps_bounding_box_size_depth indicates the depth of the source bounding box in the Cartesian coordinates. When not present, the value of sps_bounding_box_size_depth is inferred to be 1. When not present, the value of sps_bounding_box_size_depth is inferred to be 0.

sps_source_scale_factor indicates the scale factor of the source point cloud.

sps_seq_parameter_set_id provides an identifier for the SPS for reference by other syntax elements. In The value of sps_seq_parameter_set_id may be in the range of 0 to 15, inclusive in bitstreams conforming to this version of this Specification. The value other than 0 for sps_seq_parameter_set_id is reserved for future use by ISO/IEC.

sps_num_attribute_sets indicates the number of coded attributes in the bitstream. The value of sps_num_attribute_sets may be in the range of 0 to 64.

attribute_dimension[i] specifies the number of components of the i-th attribute. Index i may be greater than or equal to 0, and may be less than a value indicated by sps_num_attribute_sets.

attribute_instance_id[i] specifies attribute instance id.

attribute_bitdepth[i] specifies the bitdepth of the i-th attribute signal(s).

attribute_cicp_colour_primaries[i] indicates the chromaticity coordinates of the colour attribute source primaries.

attribute_cicp_transfer_characteristics[i] either indicates the reference opto-electronic transfer characteristic function of the colour attribute as a function of a source input linear optical intensity Lc with a nominal real-valued range of 0 to 1 or indicates the inverse of the reference electro-optical transfer characteristic function as a function of an output linear optical intensity Lo with a nominal real-valued range of 0 to 1.

attribute_cicp_matrix_coeffs[i] describes the matrix coefficients used in deriving luma and chroma signals from the green, blue, and red, or Y, Z, and X primaries.

attribute_cicp_video_full_range_flag[i] specifies that the black level and range of the luma and chroma signals as derived from E'Y, E'PB, and E'PR or E'R, E'G, and E'B real-valued component signals.

known_attribute_label_flag[i] equal to 1 specifies that know_attribute_label is signalled for the i-th attribute. known_attribute_label_flag[i] equal to 0 specifies that attribute_label_four_bytes is signalled for the i-th attribute.

known_attribute_label[i] equal to 0 specifies that the attribute is colour. known_attribute_label[i] equal to 1 specifies that the attribute is reflectance. known_attribute_label[i] equal to 2 specifies that the attribute is frame index.

The SPS according to the embodiments may further include signaling information about auxiliary information.

sps_aux_data_present_flag indicates whether the auxiliary data according to the embodiments is signaled through a bitstream. For example, when sps_aux_data_present_flag is equal to 1, the auxiliary data is signaled through a bitstream. When sps_aux_data_present_flag is equal to 0, the auxiliary data is not signaled through the bitstream.

sps_geom_aux_data_present_flag indicates whether the auxiliary data about geometry according to the embodiments is signaled through a bitstream. For example, when sps_geom_aux_data_present_flag is equal to 1, the auxiliary data about the geometry is signaled through a bitstream. When sps_geom_aux_data_present_flag is equal to 0, the auxiliary data about the geometry is not signaled through the bitstream.

sps_attr_aux_data_present_flag indicates whether the auxiliary data about an attribute according to the embodiments is signaled through a bitstream. For example, when sps_attr_aux_data_present_flag is equal to 1, the auxiliary data about the attribute is signaled through a bitstream. When sps_attr_aux_data_present_flag is equal to 0, the auxiliary data about the attribute is not signaled through the bitstream.

sps_extension_present_flag equal to 1 specifies that the sps_extension_data syntax structure is present in the SPS RBSP syntax structure. sps_extension_present_flag equal to 0 specifies that this syntax structure is not present. When not present, the value of sps_extension_present_flag is inferred to be equal to 0.

sps_extension_data_flag may have any value. Its presence and value do not affect decoder conformance to profiles specified in Annex A Decoders conforming to a profile specified in Annex A.

The point cloud data transmission device according to the embodiments may transmit the bitstream in the form described above, thereby increasing compression efficiency, increasing image quality performance, and reducing the burden on the reception device.

FIG. 19 shows a structure of a geometry parameter set (GPS) of point cloud data according to embodiments.

The bitstream of the point cloud data according to the embodiments may include a geometry parameter set 1900 including signaling information (or flags) as shown in this figure. The geometry parameter set 1900 of this figure may refer to the geometry parameter set 27002 described with reference to FIG. 17. The point cloud data receiver according to the embodiments may decode the point cloud data based on the signaling information (or flag information) of this figure.

gps_geom_parameter_set_id provides an identifier for the GPS for reference by other syntax elements. The value of gps_seq_parameter_set_id may be in the range of 0 to 15, inclusive.

gps_seq_parameter_set_id specifies the value of sps_seq_parameter_set_id for the active SPS. The value of gps_seq_parameter_set_id shall be in the range of 0 to 15, inclusive.

geometry_coding_type indicates that the coding type for the geometry in Table 7 1 Table 7 1 for the given value of geometry_coding_type. The value of geometry_coding_type shall be equal to 0 or 1 in bitstreams conforming to this version of this Specification. Other values of geometry_coding_type are reserved for future use by ISO/IEC. Decoders conforming to this version of this Specification may ignore reserved values of geometry_coding_type. 0=Octree, 1=Triangle Soup (Trisoup)).

gps_box_present_flag equal to 1 specifies an additional bounding box information is provided in a geometry header that references the current GPS. gps_bounding_box_present_flag equal to 0 specifies that additional bounding box information is not signalled in the geometry header.

unique_geometry_points_flag equal to 1 indicates that all output points have unique positions. unique_geometry_points_flag equal to 0 indicates that the output points may have same positions.

neighbour_context_restriction_flag equal to 0 indicates that octree occupancy coding uses contexts determined from six neighbouring parent nodes. neighbour_context_restriction_flag equal to 1 indicates that octree coding uses contexts determined from sibling nodes only.

inferred_direct_coding_mode_enabled_flag equal to 0 indicates the octree coding uses inferred_direct_coding_mode. inferred_direct_coding_mode_enabled_flag equal to 1 indicates the octree coding uses multiple context determined from sibling neighbouring nodes.

log 2_neighbour_avail_boundary specifies the value of the variable NeighbAvailBoundary that is used in the decoding process as follows:

NeighbAvailBoundary=2 log 2_neighbour_avail_boundary

When neighbour_context_restriction_flag is equal to 1, NeighbAvailabilityMask is set equal to 13. Otherwise, neighbour_context_restriction_flag equal to 0, NeighbAvailabilityMask is set equal to (1<<log 2_neighbour_avail_boundary).

log 2_trisoup_node_size specifies the variable TrisoupNodeSize as the size of the triangle nodes as follows.

TrisoupNodeSize=2 log 2_trisoup_node_size

The value of log 2_trisoup_node_size may be equal to or greater than 0. When log 2_trisoup_node_size is equal to 0, the geometry bitstream includes only the octree coding syntax.

trisoup_depth specifies the number of bits used to represent each component of a point coordinate. The value of trisoup_depth may be in the range of 2 to 21. [Ed(df): 21 should perhaps be a level limit].

trisoup_triangle_level specifies the level at which the octree is pruned. The value of trisoup_triangle_level may be in the range of 1 to trisoup_depth−1.

gps_extension_present_flag equal to 1 specifies that the gps_extension_data syntax structure is present in the GPS RBSP syntax structure. gps_extension_present_flag equal to 0 specifies that this syntax structure is not present. When not present, the value of gps_extension_present_flag is inferred to be equal to 0.

gps_extension_data_flag may have any value. Its presence and value do not affect decoder conformance to profiles specified in Annex A. Decoders conforming to a profile specified in Annex A.

When sps_geom_aux_data_present_flag is equal to 1, the GPS according to the embodiments may further include signaling information 1801 about the auxiliary data.

gps_geom_aux_data_info indicates types of auxiliary data (e.g., metadata, point cloud data, text data, etc.) according to embodiments. For example, gps_geom_aux_data_info equal to 0 indicates that the type of the auxiliary data is metadata (e.g., a coding parameter or the number of points). gps_geom_aux_data_info equal to 1 indicates that the type of the auxiliary data is point cloud data (e.g., geometry or attribute data). gps_geom_aux_data_info equal to 2 indicates that the type of the auxiliary data is text data (e.g., text information about point cloud content) (1901).

gps_geom_aux_data_info_type indicates detailed characteristics of the auxiliary data. For example, when gps_geom_aux_data_info_type is equal to 0, the auxiliary data according to the embodiments represents geometry residual information for coding the quality of lossless (e.g., lossless or near-lossless) point cloud content by the reception device (1902). Since the quality of the lossless point cloud content is the same as that described with reference to FIG. 4, a detailed description thereof will be omitted. When the point cloud content is lossy-compressed, a difference (e.g., a geometry residual) may be produced between the original point cloud data and the point cloud data with degraded image quality. The auxiliary data may include geometry residual information.

When gps_geom_aux_data_info_type is equal to 1, the auxiliary data represents additional geometry data for PSNR enhancement (1902). When the point cloud content is lossy-compressed, a difference (e.g., a geometry residual) may be produced between the original point cloud data and the point cloud data with degraded image quality. In the following description, cloud_A is defined as a set of points for the original cloud, and cloud_B is defined as a point cloud with degraded image quality.

Original Point Cloud (cloud$_A$)={($v_i$): $i$=0 . . . $K$−1}

Degraded Point Cloud (cloud$_B$)={($v_i$): $i$=0 . . . $N$−1}

Assuming that the sum of the Hausdorff distances of all points vi of cloud_A and all points vi of cloud_B is eA,B, the equation representing the quality of the two point clouds as PSNR may be given as follows.

$$PSNR_{cloudA,B} = 10\log_{10}\frac{p^2}{e_{A,B}}$$

Accordingly, the auxiliary data according to the embodiments may include additional geometry data for PSNR enhancement.

When gps_geom_aux_data_info_type is equal to 2, the auxiliary data represents indexing information (e.g., indexing information of FIG. 9) about neighbor points for reducing decoding time in the reception device (1803). The reception device according to the embodiments may predict an attribute value of a point based on the searched neighbor points. Since the process of predicting the attribute value of a point is the same as that described with reference to FIG. 9, a detailed description thereof will be omitted. The reception device according to the embodiments may use a K-D tree or a Morton code (e.g., the K-D tree or the Morton code of FIG. 4) to search for neighbor points. When neighbor points are searched using the K-D tree or the Morton code, latency occurs in the decoding process of the reception device. Accordingly, the reception device may reduce latency in the decoding process by using the auxiliary data including the indexing information about the neighbor points.

When gps_geom_aux_data_info_type is equal to 3, the auxiliary data represents geometry data about duplicated points (1902). The duplicated points (or multiple points) represent a case where two or more points are present in one voxel and have the same attribute value or different attribute values. That is, a voxel including duplicated points means a voxel having at least two points (or at least two pieces of attribute information). The transmission device according to the embodiments may perform a duplicated point merging operation of averaging attribute values of the duplicated points to match the same to one attribute value. When the reception device according to the embodiments performs the decoding operation using the merged duplicated points, it may fail to accurately decode data in which points are densely distributed in a specific region. Accordingly, using the auxiliary data including the geometry data about the duplicated points, the reception device according to the embodiments may accurately decode point cloud data (e.g., point cloud data related to autonomous driving, etc.) in which points are sparsely distributed or points are densely distributed only in a specific region, thereby providing users with a realistic point cloud environment.

That is, the auxiliary data according to the embodiments may be defined based on a combination of gps_geom_aux_data_info and gps_geom_aux_data_info_type.

The auxiliary data is not limited to the above-described examples, and may include various kinds of information.

gps_optional_flag indicates whether the auxiliary data is essential information for decoding of the reception device. For example, gps_optional_flag equal to 1 indicates that the auxiliary data is not essential information for decoding of the reception device. gps_optional_flag equal to 0 indicates that the auxiliary data is essential information for decoding of the reception device.

gps_slice_id indicates a bitstream associated with a geometry signaled in the GPS according to the embodiments.

The point cloud data transmission device according to the embodiments may transmit the information of the geometry parameter set described in this figure such that the reception device may adjust the latency in the decoding operation or perform more accurate rendering according to the characteristics of the point cloud data. Thereby, point cloud content suitable for the reception environment may be provided to the user. The point cloud data transmission device according to the embodiments may transmit the bitstream in the form described above, thereby increasing compression efficiency, increasing image quality performance, and reducing the burden on the reception device.

FIG. 20 shows a structure of an attribute parameter set (APS) of point cloud data according to embodiments.

A bitstream of point cloud data according to embodiments may include a geometry parameter set 2000 including the signaling information (or flags) of this figure. The geometry parameter set 2000 of this figure may represent the geometry parameter set 27002 described with reference to FIG. 17. The point cloud data receiver according to the embodiments may decode the point cloud data based on the signaling information (or flag information) of this figure.

aps_attr_parameter_set_id may provide an identifier for the APS for reference by other syntax elements. The value of aps_attr_parameter_set_id shall be in the range of 0 to 15, inclusive.

aps_seq_parameter_set_id may specify the value of sps_seq_parameter_set_id for the active SPS. The value of aps seq_parameter_set_id shall be in the range of 0 to 15, inclusive.

attr_coding_type may indicate the coding type for the attribute for the given value of attr_coding_type. The value of attr_coding_type shall be equal to 0, 1, or 2 in bitstreams conforming to the version of the corresponding specification. Other values of attr_coding_type are reserved for future use by ISO/IEC. Decoders conforming to this version of the specification may ignore the reserved values of attr_coding_type. attr_coding_type equal to 0 may indicate predicting weight lifting. attr_coding_type equal to 1 may indicate region adaptive hierarchical transform (RAHT). attr_coding_type equal to 2 may indicate fixed weight lifting (0=Predicting weight lifting, 1=Region Adaptive Hierarchical Transferm (RAHT), 2=Fixed weight lifting).

isLifting indicates whether the coding type for the attribute according to the embodiments is a method based on lifting. For example, isLifting indicates whether the coding type is predicting weight lifting or fixed weight lifting. isLifting may have a specific value (e.g., 0 or 1) to indicate whether the coding type for the attribute is a method based on the lifting. For example, when attr_coding_type is equal to 0 (i.e., the coding type for the attribute is predicting weight lifting) or 2 (i.e., the coding type for the attribute is fixed weight lifting), isLifting may be equal to 1 (namely, it may indicate that the coding type for the attribute is a method based on the lifting). For example, when attr_coding_type is equal to 1 (i.e., the coding type for the attribute is RAHT), isLifting may be 0 (namely, it may indicate that the coding type for the attribute is not a method based on the lifting).

When isLifting is equal to 1, the APS 30000 may include some or all of the parameters num_pred_nearest_neighbours, max_num_direct_predictors, lifting_search_range, lifting_quant_step_size, lifting_quant_step_size_chroma, lod_binary_tree_enabled_flag, and num_detail_levels_minus1. Also, when isLifting is equal to 1, the APS 30000 may include sampling_distance_squared information according to the value of num_detail_levels_minus1 (i.e., the number of LODs).

num_pred_nearest_neighbours may be information about the maximum number of nearest neighbors. The value of numberOfNearestNeighboursInPrediction shall be in the range of 1 to xx.

max_num_direct_predictors is information that may indicate the number of predictors to be used for direct prediction. The value of max_num_direct_predictors shall be in the range of 0 to num_pred_nearest_neighbours. The value of the variable MaxNumPredictors used in the decoding operation may be represented as follows.

MaxNumPredictors=max_num_direct_predicots+1 lifting_search_range may indicate a search range for lifting.

lifting_quant_step_size may indicate a quantization step for the first component of the attribute. The value of lifting_quant_step_size shall be in the range of 1 to xx.

lifting_quant_step_size_chroma may indicate a quantization step size for a chroma component of the attribute when the attribute is color. The value of lifting_quant_step_size_chroma shall be in the range of 1 to xx.

lod_binary_tree_enabled_flag may indicate whether a binary tree is applied to log generation.

num_detail_levels_minus1 indicates the number of levels of detail for attribute coding. The value of num_detail_levels_minus1 shall be in the range of 0 to xx.

sampling_distance_squared [idx] may specify the square of the sampling distance for idx. The value of sampling_distance_squared shall be in the range of 0 to xx. The value of idx may be in the range of 0 to num_detail_levels_minus1. That is, the APS 30000 may include a parameter sampling_distance_squared according to the number of levels of detail (i.e., num_detail_levels_minus1+1) for attribute coding.

When attr_coding_type is equal to 0 (i.e., the coding type for the attribute is predicting weight lifting), the APS 30000 may further include a parameter adaptive_prediction_threshold.

adaptive_prediction_threshold may specify a threshold of prediction.

When attr_coding_type is equal to 1 (i.e., the coding type for the attribute is RAHT), the APS 30000 may further parameters include raht_depth, raht_binarylevel_threshold, and raht_quant_step_size.

raht_depth may indicate the number of levels of detail for RAHT. The value of depthRAHT may range from 1 to xx.

raht_binarylevel_threshold may indicate a level of detail for cutting out a RAHT coefficient. The value of binaryLevelThresholdRAHT shall be in the range of 0 to xx.

raht_quant_step_size may specify the quantization step size for the first component of the attribute. The value of quant_step_size shall be in the range of 1 to xx.

When sps_attr_aux_data_present_flag is equal to 1, the APS according to the embodiments may further include signaling information about the auxiliary data.

aps_attr_aux_data_info indicates types of auxiliary data (e.g., metadata, point cloud data, text data, etc.) according to embodiments. For example, aps_attr_aux_data_info equal to 0 indicates that the type of the auxiliary data is metadata (e.g., a coding parameter or the number of points). aps_attr_aux_data_info equal to 1 indicates that the type of the auxiliary data is point cloud data (e.g., geometry or attribute data). aps_attr_aux_data_info equal to 2 indicates that the type of the auxiliary data is text data (e.g., text information about point cloud content) (2001).

aps_attr_aux_data_info_type indicates detailed characteristics of the auxiliary data.

For example, when aps_attr_aux_data_info_type is equal to 0, the auxiliary data according to the embodiments represents attribute residual information for coding the quality of lossless (e.g., lossless or near-lossless) point cloud content by the reception device (2002). Since the quality of the lossless point cloud content is the same as that described with reference to FIG. 4, a detailed description thereof will be omitted. When the point cloud content is lossy-compressed, a difference (e.g., an attribute residual) may be produced between the original point cloud data and the point cloud data with degraded image quality. The auxiliary data may include attribute residual information.

When aps_attr_aux_data_info_type is equal to 1, the auxiliary data represents additional attribute data for PSNR enhancement (2002). When the point cloud content is lossy-compressed, a difference (e.g., an attribute residual) may be produced between the original point cloud data and the point cloud data with degraded image quality. The PSNR is the same as that described with reference to FIG. 18, and thus a detailed description thereof will be omitted. Accordingly, the auxiliary data according to the embodiments may include additional attribute information for PSNR enhancement.

When aps_attr_aux_data_info_type is equal to 2, the auxiliary data represents indexing information about neighbor points (e.g., the indexing information of FIG. 9) for reducing decoding time in the reception device (2002). The reception device according to the embodiments may predict an attribute value of a point based on the searched neighbor points. Since the process of predicting the attribute value of a point is the same as that described with reference to FIG. 9, a detailed description thereof will be omitted. The reception device according to the embodiments may use a K-D tree or a Morton code (e.g., the K-D tree or the Morton code of FIG. 4) to search for neighbor points. When neighbor points are searched using the K-D tree or the Morton code, latency occurs in the decoding process of the reception device. Accordingly, the reception device may reduce latency in the decoding process by using the auxiliary data including the indexing information about the neighbor points.

When aps_attr_aux_data_info_type is equal to 3, the auxiliary data represents attribute data about duplicated points (2002). The duplicated points (or multiple points) represent a case where two or more points are present in one voxel and have the same attribute value or different attribute values. That is, a voxel including duplicated points means a voxel having at least two points (or at least two pieces of attribute information). The transmission device according to the embodiments may perform a duplicated point merging operation of averaging attribute values of the duplicated points to match the same to one attribute value. When the reception device according to the embodiments performs the decoding operation using the merged duplicated points, it may fail to accurately decode data in which points are densely distributed in a specific region. Accordingly, using the auxiliary data including the attribute data about the duplicated points, the reception device according to the embodiments may accurately decode point cloud data (e.g., point cloud data related to autonomous driving, etc.) in which points are sparsely distributed or points are densely distributed only in a specific region, thereby providing users with a realistic point cloud environment.

That is, the auxiliary data according to the embodiments may be defined based on a combination of aps_attr_aux_data_info and aps_attr_aux_data_info_type.

The auxiliary data is not limited to the above-described examples, and may include various kinds of information.

aps_optional_flag indicates whether the auxiliary data is essential information for decoding of the reception device. For example, aps_optional_flag equal to 1 indicates that the auxiliary data is not essential information for decoding of the reception device. aps_optional_flag equal to 0 indicates that the auxiliary data is essential information for decoding of the reception device.

aps_slice_id indicates a bitstream associated with an attribute signaled in the GPS according to the embodiments.

aps_extension_present_flag equal to 1 specifies that the aps_extension_data syntax structure is present in the APS RBSP syntax structure. aps_extension_present_flag equal to 0 specifies that this syntax structure is not present. When not present, the value of aps_extension_present_flag may be inferred to be equal to 0.

When aps_extension_present_flag is equal to 1, the APS according to the embodiments may further include a parameter aps_extension_data_flag.

aps_extension_data_flag may have any value. Its presence and value may not affect decoder performance.

The point cloud data transmission device according to the embodiments may transmit the information of the attribute parameter set described in this figure such that the reception device may adjust the latency in the decoding operation or perform more accurate rendering according to the characteristics of the point cloud data. Thereby, point cloud content suitable for the reception environment may be provided to the user. The point cloud data transmission device according to the embodiments may transmit the bitstream in the form described above, thereby increasing compression efficiency, increasing image quality performance, and reducing the burden on the reception device.

FIG. 21 shows a structure of an auxiliary slice bitstream of point cloud data according to embodiments.

The point cloud data bitstream according to the embodiments may include an auxiliary slice bitstream 2100 shown in this figure. This figure shows an auxiliary slice bitstream 2100 included in a slice (e.g., the slice 27005 of FIG. 17) according to embodiments. The auxiliary slice bitstream includes auxiliary_slice_header (auxsh) and auxiliary_slice_data. The auxsh may be header information included in an auxiliary data bitstream included in one or more slices. That is, the auxsh may be header information for the auxiliary data included in the slice. Also, auxiliary_slice_data may be data about the auxiliary information included in the slice. The auxsh, which is the header information of the auxiliary data, may include parameters auxsh_parameter_set_id, auxsh_slice_id, auxsh_data_type, auxsh_data_info, auxsh_data_info_type, auxsh_codec_type, and auxsh_lossless_flag_auxsh_num_points.

auxsh_parameter_set_id specifies an indicator for a parameter set referenced by the auxiliary data.

auxsh_slice_id specifies an indicator for a slice including the auxiliary data.

auxsh_data_type indicates a type of data related to the auxiliary data according to the embodiments. For example, when auxsh_data_type is equal to 0, the auxiliary data is information related to general data (e.g., text information related to the point cloud content described with reference to FIG. 19). When auxsh_data_type is equal to 1, the auxiliary data is information related to geometry data (e.g., the geometry residual information described with reference to FIG. 19). When auxsh_data_type is equal to 2, the auxiliary data is information related to attribute data (e.g., the auxiliary data described with reference to FIG. 20, coefficient information for scalable coding, etc.). The type of data related to the auxiliary data is not limited to the above-described examples, and may be information related to various kinds of data (2101).

auxsh_data_info indicates types of auxiliary data (e.g., metadata, point cloud data, text data, etc.) according to embodiments. For example, auxsh_data_info equal to 0 indicates that the type of the auxiliary data is metadata (e.g., a coding parameter or the number of points). auxsh_data_info equal to 1 indicates that the type of the auxiliary data is point cloud data (e.g., geometry or attribute data). auxsh_data_info equal to 2 indicates that the type of the auxiliary data is text data (e.g., text information about point cloud content) (2102).

auxsh_data_info_type indicates detailed characteristics of the auxiliary data.

The auxiliary data may be defined based on a combination of auxsh_data_info and auxsh_data_info_type (2103).

For example, when auxsh_data_info is equal to 0 and auxsh_data_info_type is equal to 1, the auxiliary data represents indexing information about neighbor points (e.g., the indexing information of FIG. 9), and the type of the auxiliary data indicates metadata.

The indexing information about the neighbor points is the same as that described with reference to FIGS. 18 to 20, and thus a detailed description thereof will be omitted.

When auxsh_data_info is equal to 0 and auxsh_data_info_type is equal to 0, the auxiliary data represents coefficient information (e.g., scalable decoding information for scalable decoding), and the type of the auxiliary data is metadata.

Scalable decoding is decoding that a reception device selectively performs on a part or the entirety of geometry and/or attributes according to decoding performance. Scalable decoding supports reception devices exhibiting various performances and enables a point cloud service to be provided even in an adaptive bitrate environment. However, since attribute decoding is performed based on geometry decoding, geometry information is required to perform accurate attribute decoding. For example, a transform coefficient for RAHT coding is determined based on geometry distribution information (or geometry structure information (e.g., an octree structure)). Therefore, the reception device may receive and process all geometries in order to perform stable attribute decoding. However, it is inefficient in terms of bitrate to transmit and receive geometry information that is not actually displayed according to the performance of the reception device. In addition, decoding all the geometries by the reception device may cause a delay in providing a point cloud content service.

The reception device according to the embodiments may perform scalable attribute decoding without full geometry structure information, based on the auxiliary information including scalable decoding information (e.g., a value indicating a depth or level in an octree structure to which scalable decoding is applied, a transform coefficient for RAHT coding, etc.).

When auxsh_data_info is equal to 0 and auxsh_data_info_type is equal to 2, the auxiliary data represents information on the number of duplicated points, and the type of the auxiliary data indicates metadata.

The duplicated points are the same as those described with reference to FIGS. 18 to 20, and thus a detailed description thereof will be omitted.

When auxsh_data_info is equal to 1 and auxsh_data_info_type is equal to 0, the auxiliary data represents geometry and/or attribute information about the duplicated points, and the type of auxiliary data indicates point cloud data.

The duplicated points are the same as those described with reference to FIGS. 18 to 20, and thus a detailed description thereof will be omitted.

When auxsh_data_info is equal to 1 and auxsh_data_info_type is equal to 1, the auxiliary data represents residual information for PSNR enhancement, and the type of the auxiliary data indicates point cloud data.

The residual information for PSNR enhancement is the same as the additional geometry and/or attribute data for PSNR enhancement of FIGS. 18 to 20, and thus a detailed description thereof will be omitted.

When auxsh_data_info is equal to 1 and auxsh_data_info_type is equal to 2, the auxiliary data represents residual information for lossless coding of point cloud content.

The residual information for lossless coding of point cloud content is the same as the residual geometry and/or attribute data for lossless coding of the point cloud content described with reference to FIGS. 18 to 20, and thus a detailed description thereof will be omitted.

When auxsh_data_info is equal to 1 and auxsh_data_info_type is equal to 3, the auxiliary data represents transformed data. The transformed data means information obtained by transforming geometry position information or transforming attribute information through Pred-Lift/RAHT transformation.

The auxiliary data according to embodiments is not limited to the above-described examples, and may include various types of information.

auxsh_codec_type indicates a type of a codec used to decode the auxiliary data according to the embodiments.

auxsh_lossless_flag indicates whether the auxiliary data have been losslessly compressed. For example, auxsh_lossless_flag equal to 1 indicates that the auxiliary data have been losslessly compressed. auxsh_lossless_flag equal to 0 indicates that the auxiliary data have been near-losslessly compressed.

auxsh_num_data indicates the number of auxiliary data included in a slice.

auxiliary_slice_data indicates data about the auxiliary information included in a slice.

aux_data may specify data about auxiliary information identified by an index i. Index i is greater than or equal to 0 and less than the value indicated by auxsh_num_data.

The point cloud data transmission device according to the embodiments may transmit the auxiliary slice bitstream described in this figure such that the reception device may adjust the latency in the decoding operation or perform more accurate rendering according to the characteristics of the point cloud data. Thereby, point cloud content suitable for the reception environment may be provided to the user. The point cloud data transmission device according to the embodiments may transmit the bitstream in the form described above, thereby increasing compression efficiency, increasing image quality performance, and reducing the burden on the reception device.

FIG. 22 shows a structure of an auxiliary parameter set (AuxPS) of point cloud data according to embodiments.

The bitstream of the point cloud data according to the embodiments may include an auxiliary parameter set 2200 including signaling information (or flags) as shown in this figure. The auxiliary parameter set 2200 of this figure may be included in the bitstream of FIG. 17 (not shown in FIG. 17). The point cloud data receiver according to the embodiments may decode the point cloud data based on the signaling information (or flag information) of this figure.

auxps_aux_parameter_set_id may provide an identifier for the AuxPS for reference by other syntax elements. The value of auxps_aux_parameter_set_id shall be in the range of 0 to 15, inclusive.

auxps_seq_parameter_set_id may specify the value of sps_seq_parameter_set_id for the active SPS. The value of aps_seq_parameter_set_id shall be in the range of 0 to 15, inclusive.

auxps_num_aux_data indicates the number of types of auxiliary data associated with a corresponding sequence.

auxps_aux_id specifies an identifier for identifying auxiliary data.

auxps_optional_flag indicates whether the auxiliary data is essential information for the decoding operation of the reception device. For example, auxps_optional_flag equal to 1 indicates that the auxiliary data is not essential information for the decoding operation of the reception device. auxps_optional_flag equal to 0 indicates that the auxiliary data is essential information for the decoding operation of the reception device.

auxps_data_type indicates a type of data related to the auxiliary data according to the embodiments. For example, when auxps_data_type is equal to 0, the auxiliary data is information related to general data (e.g., annotation information related to specific data, a specific point, or a specific region). When auxps_data_type is equal to 1, the auxiliary data is information related to geometry data (e.g., geometry residual information for lossless geometry decoding). When auxps_data_type is equal to 2, the auxiliary data is information related to attribute data (e.g., the auxiliary data described with reference to FIG. 20, coefficient information for scalable coding, etc.). The type of data related to the auxiliary data is not limited to the above-described examples, and may be information related to various kinds of data (2201).

auxps_data_info indicates types of auxiliary data (e.g., metadata, point cloud data, text data, etc.) according to embodiments. For example, auxps_data_info equal to 0 indicates that the type of the auxiliary data is metadata (e.g., a coding parameter or the number of points). auxps_data_info equal to 1 indicates that the type of the auxiliary data is point cloud data (e.g., geometry or attribute data). auxps_data_info equal to 2 indicates that the type of the auxiliary data is text data (e.g., text information about point cloud content) (2202).

auxps_data_info_type indicates detailed characteristics of the auxiliary data.

The auxiliary data may be defined based on a combination of auxps_data_type and auxps_data_info_type (2203).

For example, when auxps_data_info is equal to 0 and auxps_data_info_type is equal to 0, the auxiliary data represents indexing information about neighbor points (e.g., the indexing information of FIG. 9), and the type of the auxiliary data indicates metadata.

The indexing information about the neighbor points is the same as that described with reference to FIGS. 18 to 20, and thus a detailed description thereof will be omitted.

When auxps_data_info is equal to 0 and auxps_data_info_type is equal to 1, the auxiliary data represents coefficient information (e.g., scalable decoding information for scalable decoding), and the type of the auxiliary data is metadata.

Scalable decoding is decoding that a reception device selectively performs on a part or the entirety of geometry and/or attributes according to decoding performance. Scalable decoding supports reception devices exhibiting various performances and enables a point cloud service to be provided even in an adaptive bitrate environment. However, since attribute decoding is performed based on geometry decoding, geometry information is required to perform accurate attribute decoding. For example, a transform coefficient for RAHT coding is determined based on geometry distribution information (or geometry structure information (e.g., an octree structure)). Therefore, the reception device may receive and process all geometries in order to perform stable attribute decoding. However, it is inefficient in terms of bitrate to transmit and receive geometry information that is not actually displayed according to the performance of the reception device. In addition, decoding all the geometries by the reception device may cause a delay in providing a point cloud content service.

The reception device according to the embodiments may perform scalable attribute decoding without full geometry structure information, based on the auxiliary information including scalable decoding information (e.g., a value indicating a depth or level in an octree structure to which scalable decoding is applied, a transform coefficient for RAHT coding, etc.).

When auxps_data_info is equal to 0 and auxps_data_info_type is equal to 2, the auxiliary data represents information on the number of duplicated points, and the type of the auxiliary data indicates metadata.

The duplicated points are the same as those described with reference to FIGS. 18 to 20, and thus a detailed description thereof will be omitted.

When auxps_data_info is equal to 1 and auxps_data_info_type is equal to 0, the auxiliary data represents geometry and/or attribute information about the duplicated points, and the type of auxiliary data indicates point cloud data.

The duplicated points are the same as those described with reference to FIGS. 18 to 20, and thus a detailed description thereof will be omitted.

When auxps_data_info is equal to 1 and auxps_data_info_type is equal to 1, the auxiliary data represents residual information for PSNR enhancement, and the type of the auxiliary data indicates point cloud data.

The residual information for PSNR enhancement is the same as the additional geometry and/or attribute data for PSNR enhancement of FIGS. 18 to 20, and thus a detailed description thereof will be omitted.

When auxps_data_info is equal to 1 and auxps_data_info_type is equal to 2, the auxiliary data represents residual information for lossless coding of point cloud content.

The residual information for lossless coding of point cloud content is the same as the residual geometry and/or attribute data for lossless coding of the point cloud content described with reference to FIGS. 18 to 20, and thus a detailed description thereof will be omitted.

When auxps_data_info is equal to 1 and auxps_data_info_type is equal to 3, the auxiliary data represents transformed data. The transformed data means information obtained by transforming geometry position information or transforming attribute information through Pred-Lift/RAHT transformation.

The auxiliary data according to embodiments is not limited to the above-described examples, and may include various types of information.

auxps_codec_type indicates a type of a codec used to decode the auxiliary data according to the embodiments.

The auxps auxiliary data use order (auxps_rec_order) indicates an order in which the reception device uses the auxiliary data when there is a plurality of auxiliary data.

auxps_lossless_flag indicates whether the auxiliary data have been losslessly compressed. For example, auxps_lossless_flag equal to 1 indicates that the auxiliary data have been losslessly compressed. auxps_lossless_flag equal to 0 indicates that the auxiliary data have been near-losslessly compressed.

auxps_extension_present_flag equal to 1 specifies that the auxps_extension_data syntax structure is present in the AuxPS RBSP syntax structure. auxps_extension_present_flag equal to 0 specifies that this syntax structure is not present. When not present, the value of auxps_extension_present_flag may be inferred to be equal to 0.

When auxps_extension_present_flag is equal to 1, the AuxPS according to the embodiments may further include a parameter auxps_extension_data_flag.

auxps_extension_data_flag may have any value. Its presence and value may not affect decoder performance.

The point cloud data transmission device according to the embodiments may transmit the information of the auxiliary parameter set described in this figure such that the reception device may adjust the latency in the decoding operation or perform more accurate rendering according to the characteristics of the point cloud data. Thereby, point cloud content suitable for the reception environment may be provided to the user. The point cloud data transmission device according to the embodiments may transmit the bitstream in the form described above, thereby increasing compression efficiency, increasing image quality performance, and reducing the burden on the reception device.

FIG. 23 shows a structure of an auxiliary slice bitstream of point cloud data according to embodiments.

The point cloud data bitstream according to the embodiments may include an auxiliary slice bitstream 2300 shown in this figure. This figure shows an auxiliary slice bitstream 2300 included in a slice (e.g., the slice 27005 of FIG. 17) according to embodiments. The auxiliary slice bitstream includes auxiliary_slice_header (auxsh) and auxiliary_slice_data. The auxsh may be header information included in an auxiliary data bitstream included in one or more slices. That is, the auxsh may be header information for the auxiliary data included in the slice. Also, auxiliary_slice_data may be data about the auxiliary information included in the slice. The auxsh, which is the header information of the auxiliary data, may include parameters auxsh_aux_parameter_set_id, auxsh_slice_id, auxsh_ref_geom_slice_id, auxsh_ref_attr_slice_id, auxsh_num_aux_data_types, auxsh_data_type, auxsh_data_info, auxsh_data_info_type, auxsh_aux_id, and auxsh_num_voxel.

auxsh_aux_parameter_set_id specifies an indicator for the auxiliary parameter set (e.g., the auxiliary parameter set 2200 of FIG. 22) referenced by the auxiliary data.

auxsh_slice_id specifies an indicator for a slice including the auxiliary data.

auxsh_ref_geom_slice_id) specifies an indicator for a slice including geometry data related to the auxiliary data.

auxsh_ref_attr_slice_id specifies an indicator for a slice including attribute data related to the auxiliary data.

auxsh_num_aux_data_types indicates the number of data types related to the auxiliary data.

auxsh_data_type indicates a type of data related to the auxiliary data identified by an index i. Index i is greater than or equal to 0 and less than the value indicated by auxsh_num_data_types. auxsh_data_type according to the embodiments is the same as that described with reference to FIG. 21, and thus a detailed description thereof will be omitted.

auxsh_data_info) indicates the type of auxiliary data (e.g., metadata, point cloud data, text data, etc.) identified by an index i. Index i is greater than or equal to 0 and less than the value indicated by auxsh_num_data_types. auxsh_data_info according to the embodiments is the same as that described with reference to FIG. 21, and thus a detailed description thereof will be omitted.

auxsh_data_info_type indicates detailed characteristics of the auxiliary data identified by an index i. Index i is greater than or equal to 0 and less than the value indicated by auxsh_num_data_types. auxsh_data_info_type according to the embodiments is the same as that described with reference to FIG. 21, and thus a detailed description thereof will be omitted.

The auxiliary data may be defined based on a combination of auxsh_data_info and auxsh_data_info_type.

auxsh_aux_id specifies an indicator for auxiliary data identified by an index i.

auxsh_num_voxel indicates the number of voxels related to the auxiliary data included in a slice.

auxiliary_slice_data indicates data about the auxiliary information included in a slice. According to embodiments, auxiliary_slice_data may include voxel idx type, voxel index, aux_id, data_present_flag, and/or aux_data.

voxel_idx_type indicates the type of an identifier for a voxel identified by an index i. Index i is greater than or equal to 0 and less than the value indicated by auxsh_num_voxel. For example, voxel_idx_type indicates whether an identifier for the voxel is an XYZ position or a Morton code index.

voxel_index indicates information on an identifier for a voxel identified by an index i. Index i is greater than or equal to 0 and less than the value indicated by auxsh_num_voxel. For example, when the identifier for the voxel is an XYZ position, voxel_idx_type indicates a value of the XYZ position. When the identifier for the voxel is a Morton code index, voxel_idx_type indicates a value of the Morton code index.

aux_id specifies an indicator for identifying the type of data related to the auxiliary data identified by an index i and an index j. Index j is greater than or equal to 0 and less than the value indicated by auxsh_num_aux_data_types.

data_present_flag indicates whether auxiliary data identified by an index i and an index j is present. Index j is greater than or equal to 0 and less than the value indicated by auxsh_num_aux_data_types.

when data_present_flag indicates TRUE, auxiliary_slice_data further includes aux_data.

aux_data specifies data about auxiliary information identified by an index i and an index j.

The point cloud data transmission device according to the embodiments may transmit the information of the auxiliary slice bitstream described in this figure such that the reception device may adjust the latency in the decoding operation or perform more accurate rendering according to the characteristics of the point cloud data. Thereby, point cloud content suitable for the reception environment may be provided to the user. The point cloud data transmission device according to the embodiments may transmit the bitstream in the form described above, thereby increasing compression efficiency, increasing image quality performance, and reducing the burden on the reception device.

Figure 24:
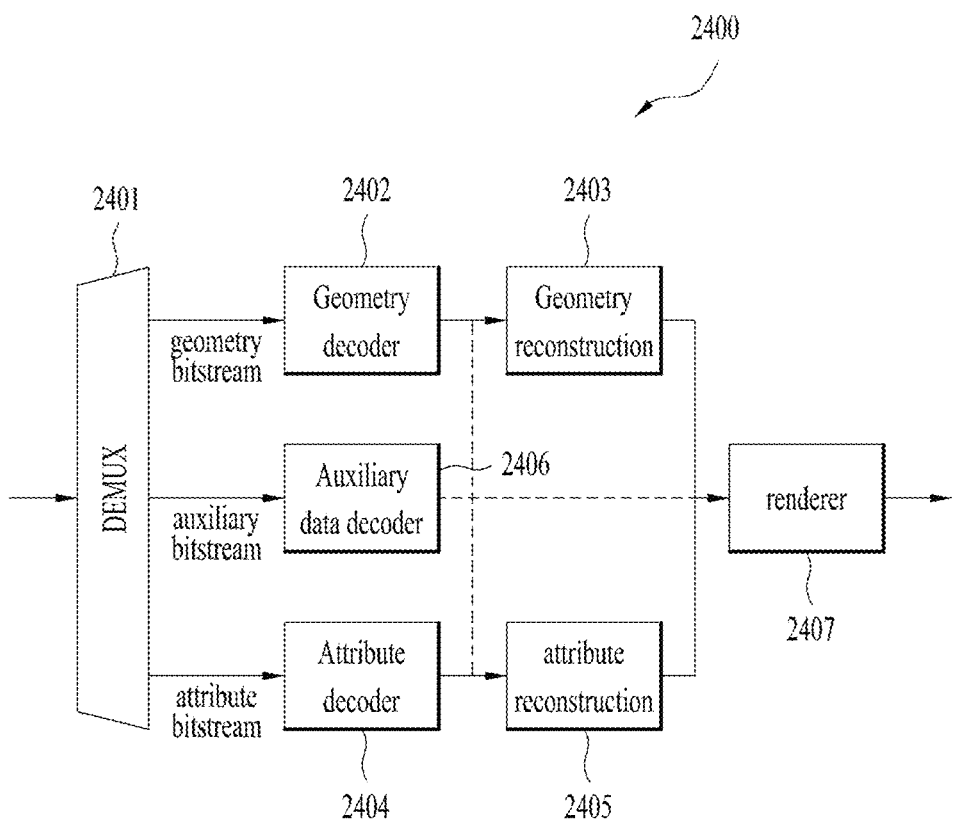
FIG. 24 is a block diagram illustrating an exemplary point cloud data reception device according to embodiments.

FIG. 24 is a block diagram illustrating an exemplary point cloud data reception device according to embodiments.

A point cloud data reception device 2400 according to the embodiments may perform an operation corresponding to the reverse process of the operation of the point cloud data transmission device 1500 described with reference to FIG. 15.

The point cloud data reception device (e.g., the point cloud data reception device of FIGS. 1, 2, 10, 13 and 14) according to the embodiments described in this figure may perform the decoding operation described with reference to FIGS. 1 to 23. Also, the point cloud data reception device may consume the point cloud content using the auxiliary data described with reference to FIGS. 15 to 23. The point cloud data reception device may include a demultiplexer (DEMUX) 2401, a geometry decoder 2402, a geometry reconstructor (Geometry reconstruction) 2403, an attribute decoder 2404, an attribute reconstructor (Attribute reconstruction) 2405, an auxiliary decoder 2406, and/or a renderer 2407. Although not shown in this figure, the point cloud data reception device according to the embodiments may further include one or more elements configured to perform the decoding operation described with reference to FIGS. 1 to 23. Each element in this figure may correspond to hardware, software, a processor, and/or a combination thereof.

The DEMUX receives a point cloud data bitstream (e.g., the bitstream of FIGS. 17 to 23). The point cloud data bitstream includes a geometry bitstream, an attribute bitstream, and/or an auxiliary bitstream.

The auxiliary decoder according to the embodiments receives the auxiliary bitstream and decodes auxiliary data. The auxiliary data represents the auxiliary data described with reference to FIGS. 1 to 23. The auxiliary decoder may transmit the decoded auxiliary data to a geometry or attribute decoder (shown in this figure), the geometry or attribute reconstructor, or the renderer, depending on the signaling information about the auxiliary data (e.g., the signaling information of FIGS. 18 to 23). The auxiliary decoder may deliver the decoded auxiliary data of the metadata type (e.g., the indexing information about neighbor points, coefficient information, and information about the number of duplicated points described with reference to FIGS. 18 to 23) to the geometry or attribute decoder. The auxiliary decoder may deliver the decoded auxiliary data of the point cloud data type (e.g., the geometry/attribute information about the duplicated points, residual information for PSNR enhancement, residual information for lossless coding, and transformed information described with reference to FIGS. 18 to 23) to the geometry or attribute reconstructor. The auxiliary decoder may deliver the decoded auxiliary data of the text type (e.g., text information about the point cloud data described with reference to FIGS. 18 to 23) to the renderer.

The geometry decoder according to the embodiments receives a geometry bitstream and performs the geometry decoding described with reference to FIGS. 1 to 23. Also, the geometry decoder may perform geometry decoding based on the auxiliary data (e.g., the auxiliary data of the metadata type) described with reference to FIGS. 15 to 23. For example, the geometry decoder may perform geometry decoding based on auxiliary execution information representing information on the number of duplicated points (e.g., the information on the number of duplicated points described with reference to FIGS. 21 and 22). The geometry decoder may perform geometry decoding based on the auxiliary data representing the indexing information about the neighbor points (e.g., the indexing information about neighbor points described with reference to FIGS. 19, 21, and 22). The geometry decoder delivers the decoded geometry data to the geometry reconstructor.

The geometry reconstructor according to the embodiments performs the geometry reconstruction described with reference to FIGS. 1 to 23. Also, the geometry reconstructor may perform geometry reconstruction based on the auxiliary data (e.g., the auxiliary data of the point cloud data type) described with reference to FIGS. 15 to 23. For example, the geometry reconstructor may perform the geometry reconstruction based on the auxiliary data representing the geometry information about the duplicated points (e.g., the geometry information about the duplicated points described with reference to FIGS. 19, 21, and 22). The geometry reconstructor may perform the geometry reconstruction based on the auxiliary data representing the geometry residual information for PSNR enhancement or lossless coding (e.g., the geometry residual information for PSNR enhancement or lossless coding described in FIGS. 19, 21, and 22). The geometry reconstructor delivers the reconstructed geometry data to the renderer.

The attribute decoder according to the embodiments receives an attribute bitstream and performs the attribute decoding described with reference to FIGS. 1 to 23. Also, the attribute decoder may perform attribute decoding based on the auxiliary data (e.g., the auxiliary data of the metadata type) described with reference to FIGS. 15 to 23. For example, the attribute decoder may perform attribute decoding based on the auxiliary data representing indexing information about neighbor points (e.g., the indexing information about neighbor points described with reference to FIGS. 20 to 22). The attribute decoder may perform attribute decoding based on scalable decoding information (e.g., the scalable decoding information described with reference to FIGS. 21 and 22). The attribute decoder delivers the decoded attribute data to the attribute reconstructor.

The attribute reconstructor according to the embodiments performs the attribute reconstruction described with reference to FIGS. 1 to 23. Also, the attribute reconstructor may perform attribute reconstruction based on the auxiliary data (e.g., the auxiliary data of the point cloud data type) described with reference to FIGS. 15 to 23. For example, the attribute reconstructor may perform the attribute reconstruction based on the auxiliary data representing attribute information about duplicated points (e.g., the attribute information about duplicated points described with reference to FIGS. 20 to 22). The attribute reconstructor may perform the attribute reconstruction based on the auxiliary data representing attribute residual information for PSNR enhancement or lossless coding (e.g., the attribute residual information for PSNR enhancement or lossless coding described with reference to FIGS. 20 to 22). The attribute reconstructor delivers the reconstructed attribute data to the renderer.

The renderer according to the embodiments renders the decoded point cloud data. The renderer performs an operation the same as or similar to that of the renderer of FIGS. 1, 2 and 17.

The point cloud data reception device according to the embodiments may receive auxiliary data and signaling information related to the auxiliary data, and may use the decoded auxiliary data according to the type of the auxiliary data. Accordingly, the point cloud data reception device may adjust the latency in the decoding process based on the auxiliary data or perform more accurate rendering according to the characteristics of the point cloud data. Thereby, point cloud content suitable for the reception environment may be provided to users.

Figure 25:
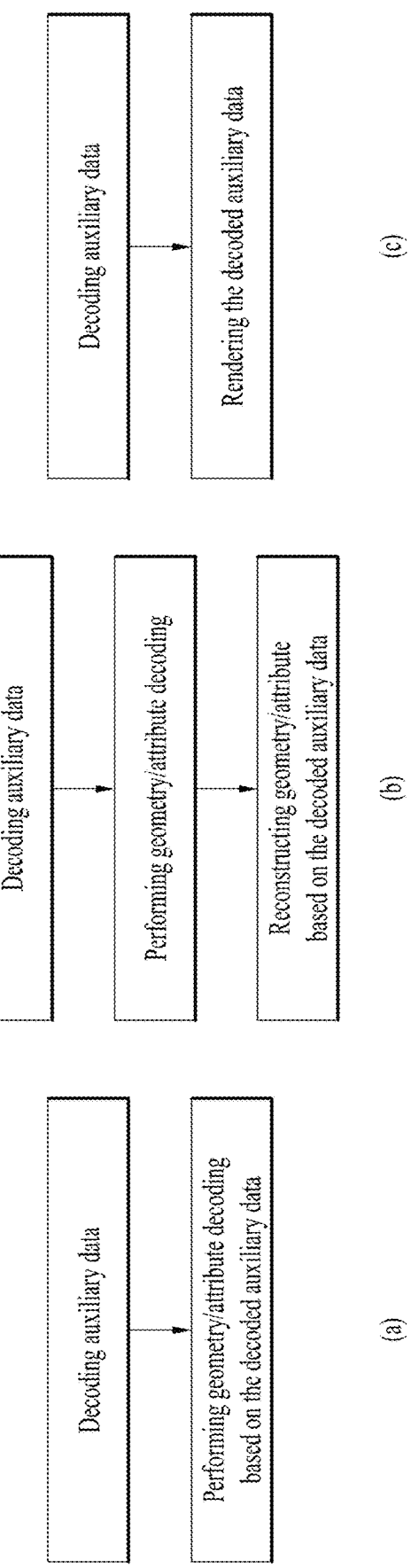
FIG. 25 is a flowchart illustrating operation of a reception device using auxiliary data according to embodiments.

FIG. 25 is a flowchart illustrating operation of a reception device using auxiliary data according to embodiments.

FIGS. 25-(a) to 25-(c) are flowcharts illustrating methods of decoding auxiliary data by a point cloud data reception device (e.g., the point cloud data reception device described with reference to FIGS. 1, 2, 13 and 24). The auxiliary data according to the embodiments is the same as that described with reference to FIGS. 15 to 24. The reception device may use the decoded auxiliary data differently according to the type of the received auxiliary data.

FIG. 25-(*a*) is a flowchart illustrating a method of using, by the reception device, auxiliary data of the metadata type (e.g., the indexing information about neighbor points, coefficient information, and information about the number of duplicated points described with reference to in FIGS. 18 to 23).

The reception device may perform auxiliary data decoding (the auxiliary data decoding of FIGS. 1 to 24) on the auxiliary data of the metadata type.

The reception device may perform geometry or attribute decoding (decoding of FIGS. 1 to 24) based on the decoded auxiliary data. For the geometry or attribute decoding based on the auxiliary data according to the embodiments, refer to the operation of the attribute decoder described with reference to FIG. 24.

FIG. 25-(*b*) is a flowchart illustrating a method of using, by the reception device, auxiliary data of the point cloud data type (e.g., the geometry/attribute information about the duplicated points, residual information for PSNR enhancement, residual information for lossless coding, and transformed information described with reference to FIGS. 18 to 23).

The reception device according to the embodiments may perform auxiliary data decoding (the auxiliary data decoding of FIGS. 1 to 24) on the auxiliary data of the point cloud data type.

The reception device may perform geometry or attribute decoding (the decoding of FIGS. 1 to 24).

The reception device may reconstruct a geometry or attributes based on the decoded auxiliary data. For reconstruction of geometry or attributes based on the auxiliary data according to the embodiments, refer to the operation of the attribute reconstructor described with reference to FIG. 24.

FIG. 25-(*c*) is a flowchart illustrating a method of using, by the reception device, auxiliary data of the text type (e.g., the text information about point cloud data described with reference to FIGS. 18 to 23).

The reception device may perform auxiliary data decoding (the auxiliary data decoding of FIGS. 1 to 24) on the auxiliary data of the text type.

The reception device may render the decoded auxiliary data.

FIG. 26 illustrates an exemplary process of using auxiliary data after decoding according to embodiments.

FIGS. 26-(*a*) to 26-(*c*) are flowcharts illustrating methods of using auxiliary data of a point cloud data type by a point cloud data reception device according to embodiments (e.g., the point cloud data reception device described with reference to FIGS. 1, 2, 13 and 24). The reception device may use the decoded auxiliary data differently according to the signaling information about the auxiliary data (e.g., the signaling information of FIGS. 21 to 23).

FIG. 26-(*a*) illustrates a method of using, by the reception device, auxiliary data representing attribute information about duplicated points. For the attribute information about the duplicated points, refer to the attribute information about duplicated points described with reference to FIGS. 18 to 23.

The reception device decodes the point cloud data and the auxiliary data. The decoding of the point cloud data and auxiliary data is the same as or similar to the decoding operation of FIGS. 1 to 25.

The reception device may use the decoded auxiliary data in the attribute reconfiguration process according to the signaling information about the auxiliary data (e.g., auxps_data_type=2, auxps_data_info=1 and auxps_data_info_type=0, or auxsh_data_type=2, auxsh_data_info=1, auxsh_data_info_type=0). Accordingly, the reception device may reconstruct attributes including duplicated points based on the decoded auxiliary data.

FIG. 26-(*b*) illustrates a method of using, by the reception device, auxiliary data representing geometry residual information for PSNR enhancement according to embodiments. For the geometry residual information for PSNR enhancement, refer to the geometry residual information for PSNR enhancement described with reference to FIGS. 18 to 23.

The reception device according to the embodiments decodes the geometry data and auxiliary data. The decoding of the geometry data and auxiliary data is the same as or similar to that of FIGS. 1 to 25.

The reception device may use the decoded auxiliary data in the geometry reconfiguration process according to the signaling information about the auxiliary data (e.g., auxps_data_type=1, auxps_data_info=1 and auxps_data_info_type=1, or auxsh_data_type=2, auxsh_data_info=1, auxsh_data_info_type=1). Accordingly, the reception device may improve the PSNR indicating the quality of the point cloud by using the decoded auxiliary data.

FIG. 26-(*c*) illustrates a method of using, by the reception device, auxiliary data representing attribute residual information for lossless coding according to embodiments. For the attribute residual information for lossless coding, refer to the attribute residual information for lossless coding described with reference to FIGS. 18 to 23.

The reception device according to the embodiments decodes the attribute data and auxiliary data. The decoding of the attribute data and auxiliary data is the same as or similar to the decoding operation of FIGS. 1 to 25.

The reception device may use the decoded auxiliary data in the geometry reconfiguration process according to the signaling information about the auxiliary data (e.g., auxps_data_type=2, auxps_data_info=1 and auxps_data_info_type=2, or auxsh_data_type=2, auxsh_data_info=1, auxsh_data_info_type=2). Accordingly, the reception device may perform lossless coding in the attribute reconstruction process using the decoded auxiliary data.

The point cloud data reception device according to the embodiments may receive auxiliary data and signaling information related to the auxiliary data, and may use the decoded auxiliary data according to the type of the auxiliary data. Accordingly, the point cloud data reception device may adjust the latency in the decoding process based on the auxiliary data or perform more accurate rendering according to the characteristics of the point cloud data. Thereby, point cloud content suitable for the reception environment may be provided to users.

Figure 27:
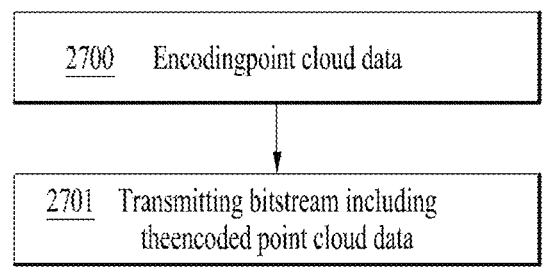
FIG. 27 is a flowchart illustrating a method of transmitting point cloud data according to embodiments.

FIG. 27 is a flowchart illustrating a method of transmitting point cloud data according to embodiments.

This figure illustrates a method of transmitting point cloud data by a point cloud data transmission device (e.g., the point cloud data transmission device of FIGS. 1, 2, 4, 11, 12 and 15) according to embodiments. The point cloud data transmission device may perform the same or similar operation to the encoding operation described with reference to FIGS. 1 to 26.

The point cloud data transmission device may encode the point cloud data (2700). The point cloud data transmission device includes a a geometry encoder configured to encode geometry representing positions of one or more points of the point cloud data, and an attribute encoder configured to encode attributes of the one or more points. The point cloud data transmission device may further include an auxiliary data encoder configured to encode auxiliary data. The geometry encoder may perform the same or similar operation to the geometry encoding operation described with reference to FIGS. 1 to 26. The attribute encoder may perform the same or similar operation to the attribute encoding operation described with reference to FIGS. 1 to 26. The auxiliary data encoder may perform the same or similar operation to that of the auxiliary data encoder 1507 described with reference to FIGS. 15 to 26.

The auxiliary data may be any one of metadata related to encoding of the point cloud data, geometry or attribute data related to encoding of the point cloud data, and text data related to the point cloud data. The metadata related to encoding of the point cloud data may be the metadata (e.g., the indexing information about points, coefficient information, information about the number of duplicated points, etc.) described with reference to FIGS. 18 to 26. The geometry or attribute data related to encoding of the point cloud data may be the point cloud data (e.g., the geometry/attribute information about points, residual information for PSNR enhancement, residual information for lossless coding, transformed information, etc.) described with reference to FIGS. 18 to 26. The text data related to the point cloud data may be the text data (e.g., the text data related to point cloud content) described with reference to FIGS. 18 to 26.

The point cloud data transmission device according to the embodiments may transmit a bitstream including the encoded point cloud data (2701). The bitstream may include signaling information about the auxiliary data. The signaling information about the auxiliary data may include first information (e.g., gps_geom_aux_data_info, aps_geom_aux_data_info, auxsh_data_info, auxps_data_info of FIGS. 19 to 22) indicating a type of the auxiliary data and second information indicating detailed characteristics of the auxiliary data (e.g., gps_geom_aux_data_info_type, aps_geom_aux_data_info_type, auxsh_data_info_type, and auxps_data_info_type of FIGS. 19 to 22). The auxiliary data may be signaled based on a combination of the first information and the second information. The signaling information according to the embodiments is the same as the signaling information of FIGS. 18 to 23, and thus a detailed description thereof will be omitted. A method of signaling the auxiliary data based on a combination of the first information and the second information included in the signaling information about the auxiliary data according to the embodiments is the same as that described with reference to FIGS. 18 to 26, and thus a detailed description thereof will be omitted.

Figure 28:
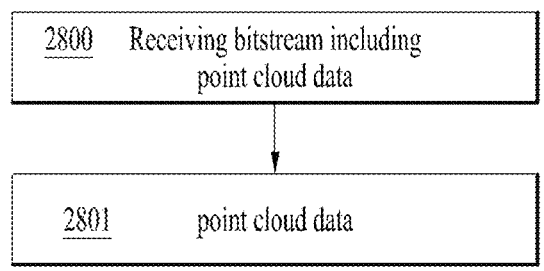
FIG. 28 is a flowchart illustrating a method of receiving point cloud data according to embodiments.

FIG. 28 is a flowchart illustrating a method of receiving point cloud data according to embodiments.

This figure illustrates a method of receiving point cloud data by a point cloud data reception device (e.g., the point cloud data reception device of FIGS. 1, 2, 10, 13, and 24) according to embodiments. The point cloud data transmission device may perform the same or similar operation to the decoding operation described with reference to FIGS. 1 to 26.

The point cloud data reception device may receive a bitstream including point cloud data (2800). The bitstream may include signaling information about the auxiliary data. The signaling information about the auxiliary data may include first information (e.g., gps_geom_aux_data_info, aps_geom_aux_data_info, auxsh_data_info, auxps_data_info of FIGS. 19 to 22) indicating a type of the auxiliary data and second information indicating detailed characteristics of the auxiliary data (e.g., gps_geom_aux_data_info_type, aps_geom_aux_data_info_type, auxsh_data_info_type, and auxps_data_info_type of FIGS. 19 to 22). The auxiliary data may be signaled based on a combination of the first information and the second information. The signaling information according to the embodiments is the same as the signaling information of FIGS. 18 to 23, and thus a detailed description thereof will be omitted. A method of signaling the auxiliary data based on a combination of the first information and the second information included in the signaling information about the auxiliary data according to the embodiments is the same as that described with reference to FIGS. 18 to 26, and thus a detailed description thereof will be omitted.

The point cloud data reception device may decode the point cloud data (2801). The point cloud data reception device may include a geometry decoder configured to decode geometry representing positions of one or more points of the point cloud data, and an attribute decoder configured to decode attributes of the one or more points. The point cloud data reception device may further include an auxiliary decoder configured to decode auxiliary data. The geometry decoder may perform the same or similar operation to the geometry decoding operation described with reference to FIGS. 1 to 26. The attribute decoder may perform the same or similar operation to the attribute decoding operation described with reference to FIGS. 1 to 26. The auxiliary decoder may perform the same or similar operation to that of the auxiliary decoder 2406 described with reference to FIGS. 24 to 26.

The auxiliary data may be any one of metadata related to decoding of the point cloud data, geometry or attribute data related to decoding of the point cloud data, and text data related to the point cloud data. The metadata related to decoding of the point cloud data is the metadata (e.g., indexing information about points, coefficient information, information about the number of duplicated points, etc.) described with reference to FIGS. 18 to 26. The geometry or attribute data related to decoding of the point cloud data may be the point cloud data described (e.g., geometry/attribute information about points, residual information for PSNR enhancement, residual information for lossless coding, transformed information, etc.) described with reference to FIGS. 18 to 26. The text data related to the point cloud data may be the text data (e.g., text data related to point cloud content) described with reference to FIGS. 18 to 26.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may indicate "A and/or B." Further, "A, B" may indicate "A and/or B." Further, "A/B/C" may indicate "at least one of A, B, and/or C." Also, "A/B/C" may indicate "at least one of A, B, and/or C." Further, in this specification, the term "or" should be interpreted as indicating "and/or." For instance, the expression "A or B" may indicate 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that variously changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method of transmitting point cloud data, the method comprising:
 encoding geometry data representing positions of one or more points of the point cloud data; and
 encoding attribute data of the one or more points by predicting the attribute data based on levels of detail:
 generating auxiliary data; and
 transmitting a bitstream including the encoded geometry data, the encoded attribute data, and parameter information for the auxiliary data,
 wherein the parameter information for the auxiliary data includes first information related to position information of a neighbor for the one or more points,
 wherein the parameter information further includes second information related to a number of duplicated points of the geometry data, and
 wherein the parameter information further includes third information related to a residual of a point of the geometry data.

2. The method of claim 1, wherein the bitstream includes signaling information about the auxiliary data, and
 wherein the signaling information about the auxiliary data includes first information indicating a type of the auxiliary data and second information indicating a detailed characteristic of the auxiliary data.

3. A device configured to transmit point cloud data, the device comprising:
 an encoder configured to:
  encode geometry data representing positions of one or more points of the point cloud data,
  encode attribute data of the one or more points by predicting the attribute data based on levels of detail, and
  generate auxiliary data; and
 a transmitter configured to transmit a bitstream including the encoded geometry data, the encoded attribute data, and parameter information for the auxiliary data,
 wherein the parameter information for the auxiliary data includes first information related to position information of a neighbor for the one or more points,
 wherein the parameter information further includes second information related to a number of duplicated points of the geometry data, and
 wherein the parameter information further includes third information related to a residual of a point of the geometry data.

4. The device of claim 3, wherein the bitstream includes signaling information about the auxiliary data, and wherein the signaling information about the auxiliary data includes first information indicating a type of the auxiliary data and second information indicating a detailed characteristic of the auxiliary data.

5. A method of receiving point cloud data, the method comprising:
   receiving a bitstream including point cloud data; and
   decoding geometry data representing positions of one or more points of the point cloud data; and
   decoding attribute data of the one or more points by predicting the attribute data based on levels of detail,
   wherein parameter information for auxiliary data includes first information related to position information of a neighbor for the one or more points, the parameter information being included in the bitstream,
   wherein the parameter information further includes second information related to a number of duplicated points of the geometry data, and
   wherein the parameter information further includes third information related to a residual of a point of the geometry data.

6. The method of claim 5, wherein the bitstream includes signaling information about the auxiliary data, and
   wherein the signaling information about the auxiliary data includes first information indicating a type of the auxiliary data and second information indicating a detailed characteristic of the auxiliary data.

7. A device configured to receive point cloud data, the device comprising:
   a receiver configured to receive a bitstream including point cloud data; and
   a decoder configured to decode (i) geometry data representing positions of one or more points of the point cloud data and (ii) attribute data of the one or more points by predicting the attribute data based on levels of detail,
   wherein parameter information for auxiliary data includes first information related to position information of a neighbor for the one or more points, the parameter information being included in the bitstream,
   wherein the parameter information further includes second information related to a number of duplicated points of the geometry data, and
   wherein the parameter information further includes third information related to a residual of a point of the geometry data.

8. The device of claim 7,
   wherein the bitstream includes signaling information about the auxiliary data, and
   wherein the signaling information about the auxiliary data includes first information indicating a type of the auxiliary data and second information indicating a detailed characteristic of the auxiliary data.

* * * * *